US012561735B2

(12) United States Patent
Baba et al.

(10) Patent No.: US 12,561,735 B2
(45) Date of Patent: Feb. 24, 2026

(54) INFORMATION PRESENTATION METHOD AND INFORMATION PROCESSING APPARATUS

(71) Applicant: Panasonic Intellectual Property Management Co., Ltd., Osaka (JP)

(72) Inventors: Takayasu Baba, Tokyo To (JP); Hiroshi Kato, Tokyo To (JP); Kazuhiko Yamauchi, Osaka Fu (JP); Akinori Ozeki, Kanagawa Ken (JP); Sadako Yamagata, Kanagawa Ken (JP); Shota Akaura, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 193 days.

(21) Appl. No.: 18/243,429

(22) Filed: Sep. 7, 2023

(65) Prior Publication Data

US 2023/0419394 A1     Dec. 28, 2023

Related U.S. Application Data

(63) Continuation of application No. PCT/JP2022/000989, filed on Jan. 13, 2022.

(30) Foreign Application Priority Data

Mar. 29, 2021     (JP) ................................. 2021-056137

(51) Int. Cl.
  *G06Q 30/0645*     (2023.01)
  *G06F 3/04817*     (2022.01)
  *G06Q 10/04*     (2023.01)

(52) U.S. Cl.
  CPC ..... *G06Q 30/0645* (2013.01); *G06F 3/04817* (2013.01); *G06Q 10/04* (2013.01)

(58) Field of Classification Search
  None
  See application file for complete search history.

(56) References Cited

U.S. PATENT DOCUMENTS

| | | | | |
|---|---|---|---|---|
| 2009/0210495 A1* | 8/2009 | Wolfson | ............. | G01C 21/3484 |
| | | | | 709/248 |
| 2016/0195404 A1* | 7/2016 | Prasad | ............... | G01C 21/3438 |
| | | | | 345/440 |

(Continued)

FOREIGN PATENT DOCUMENTS

| | | |
|---|---|---|
| JP | 2002-215739 | 8/2002 |
| JP | 2013-161093 | 8/2013 |

(Continued)

OTHER PUBLICATIONS

International Search Report (ISR) from International Searching Authority (Japan Patent Office) in International Pat. Appl. No. PCT/JP2022/000989, dated Apr. 5, 2022, together with an English language translation.

*Primary Examiner* — Michael J Sittner
(74) *Attorney, Agent, or Firm* — Greenblum & Bernstein, P.L.C.

(57)     ABSTRACT

An information presentation method is for outputting information related to a stop position of a mobile body to a user terminal in an information processing system for lending a cabin of the mobile body. The method includes registering position information representing a stop position of the mobile body, and registering purpose information representing a purpose of use of the cabin of the mobile body. The method also includes outputting, to the user terminal, trend information representing a trend of a purpose of use of the cabin in an area including the position information of mobile bodies. The trend information is output on the basis of correspondence information by which the position informa- (Continued)

tion of the mobile bodies is correlated with the purpose
information of the mobile bodies.

2 Claims, 21 Drawing Sheets

(56) References Cited

U.S. PATENT DOCUMENTS

2019/0277642 A1\*   9/2019  Schmelzer ......... G01C 21/3438
2020/0160718 A1     5/2020  Saleh

FOREIGN PATENT DOCUMENTS

JP          2019-192019        10/2019
JP          2020-035345         3/2020
JP          2020-098586         6/2020

\* cited by examiner

| CAB-IN ID | CABIN LENDING INFORMATION 300 | | | | | | | | | | | | | | | | | |
| --- | --- | --- | --- | --- | --- | --- | --- | --- | --- | --- | --- | --- | --- | --- | --- | --- | --- |
| | VEHICLE INFORMATION 311 | | | | USE CONDITION INFORMATION 310 | | | | | | | | | | LEND-ING PERIOD INFOR-MATION 314 | PRICE 315 | STATUS (RESERVED/ IN USE/ UN-RESERVED_ LENDING AVAILABLE/ UN-RESERVED_ LENDING UN-AVAILABLE) 320 |
| | LENDER ID 3111 | VEHI-CLE ID 3112 | VEHI-CLE TYPE 3113 | LEND-ING RE-GION 3114 | EQUIPMENT | TRAV-ELING POSSI-BILITY DURING LEND-ING PERIOD 312 | LEND-ING AVAIL-ABILITY DURING STOP PERIOD 313 | PURPOSE | | | | | | | | |
| | | | | | | | | USE PURPOSE INFORMATION | | | | | | | | |
| | | | | | | | | MEAL | BEV-ERAGE | CIGA-RETTE | PET | MUSIC | IMAGE CAP-TUR-ING | | | |
| C005 | A003 | 1 | XXXX | X#1, Y#1, H#1 | BLANKET, AIR CONDITIONER | NG | OK | NG | OK | NG | NG | OK | OK | WEEK-DAY | 3$/h | RESERVED |
| C002 | A012 | 2 | YYY | X#2, Y#2, H#2 | WiFi, AUDIO | OK | OK | OK | OK | OK | NG | OK | NG | 10:00 TO 15:00 | 2$/h | IN USE |
| 0004 | A015 | 3 | HH | X#4, Y#2, H#2 | AUDIO | NG | OK | NG | OK | OK | OK | NG | OK | WEEK-DAY | 2$/h | UN-RESERVED_ LENDING UN-AVAILABLE |
| 0001 | A003 | 4 | VVV | X#3, Y#3, H#3 | WiFi, VENDING MACHINE | NG | OK | OK | OK | NG | OK | OK | OK | 16:00 TO 5:00 | 1$/h | UN-RESERVED_ LENDING AVAILABLE |

| RESERVA-TION ID | CABIN ID | USER ID | RESERVATION TIME | USE HISTORY INFORMATION |
|---|---|---|---|---|
| 1 | C005 | B004 | 10:00 TO 12:00 | ccccc |
| 2 | C002 | B002 | 10:00 TO 12:00 | bbbbb |
| 3 | 0003 | B007 | 16:00 TO 16:15 | ddddd |

| IDENTIFICATION NUMBER | COORDINATES | USE PURPOSE |
|---|---|---|
| ID001 | 35.690259, 139.773107 | CONFERENCE |
| ID002 | 35.690262, 139.773108 | CONFERENCE |
| ID003 | 35.690279, 139.773109 | TELEPHONE |
| ID004 | 35.690240, 139.773110 | CHANGE DIAPER |
| ID005 | 35.690259, 139.773111 | CONFERENCE |
| ID006 | 35.690279, 139.773112 | BREASTFEEDING |

421 422 423

14

14

INFORMATION PRESENTATION METHOD AND INFORMATION PROCESSING APPARATUS

CROSS-REFERENCE TO RELATED APPLICATIONS

This application is a continuation of International Application No. PCT/JP2022/000989, filed on Jan. 13, 2022, which claims the benefit of priority of the prior Japanese Patent Application No. 2021-056137, filed on Mar. 29, 2021, the entire contents of which are incorporated herein by reference.

FIELD

The present disclosure relates generally to an information presentation method and an information processing apparatus.

BACKGROUND

A car sharing system, in which one or more vehicles are shared by multiple users, has been known (for example, JP 2020-98586 A). A user of the car sharing system can use a vehicle owned by another person, such as a business operator, by registering for use in advance without possessing the vehicle by himself/herself.

Recently, attention has been paid to the fact that a vehicle can be used not only as a means of transportation but also as a private room space. Accordingly, a system for lending a cabin, which is an internal space of a vehicle parked in a parking lot or the like, suiting the purpose of a user has been developed.

In the car sharing system as described above, there is a need to know, for each area such as a local district, a trend of each user who uses a cabin of a mobile body.

SUMMARY

An information presentation method according to the present disclosure is a method of outputting information related to a stop position of a mobile body to a user terminal in an information processing system. The information processing system is for lending a cabin of the mobile body. The information presentation method includes registering position information representing a stop position of the mobile body, and registering purpose information representing a purpose of use of the cabin of the mobile body. The information presentation method also includes outputting, to the user terminal, trend information representing a trend of a purpose of use of the cabin in an area including the position information of mobile bodies. The trend information is output on the basis of correspondence information by which the position information of the mobile bodies is correlated with the purpose information of the mobile bodies.

BRIEF DESCRIPTION OF THE DRAWINGS

Figure 1A:
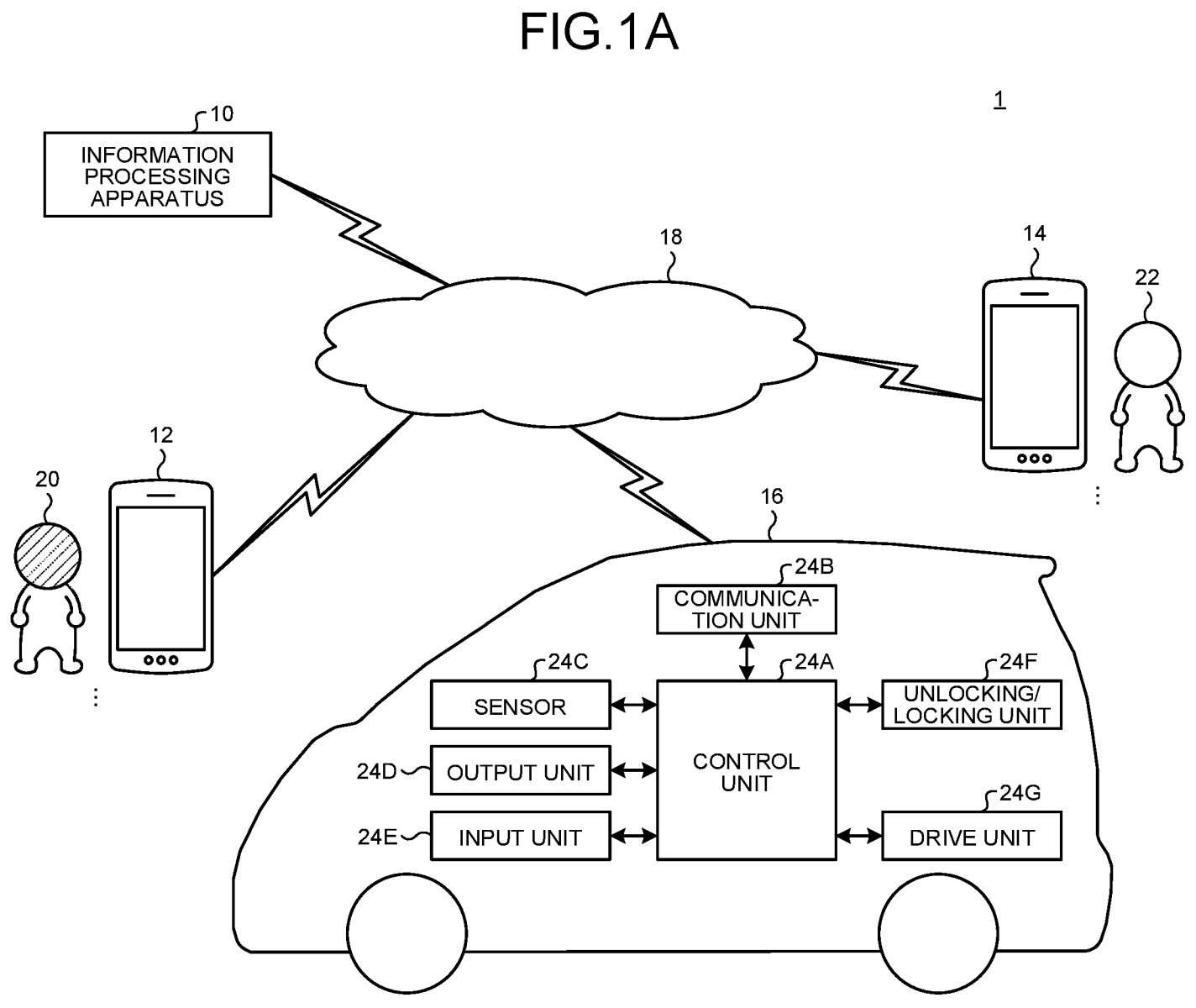

FIG. 1A is a schematic diagram illustrating an example of an information processing system of the present embodiment;

FIG. 5A is a diagram illustrating an example of a data configuration of cabin management information according to the present embodiment;

FIG. 5B is a diagram illustrating an example of a data configuration of lending management information according to the present embodiment;

FIG. 5C is a diagram illustrating an example of a data configuration of "actually used purpose (use purpose)" provided in evaluation management information of the present embodiment;

DETAILED DESCRIPTION

Figure 1B:
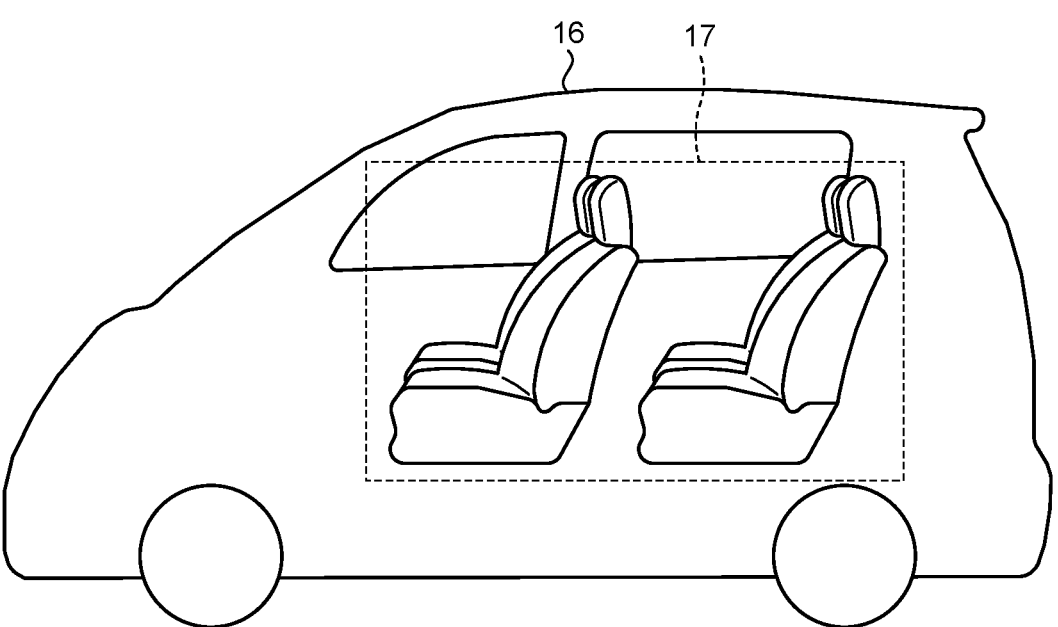
FIG. 1B is a diagram illustrating an example of a cabin of the vehicle according to the present embodiment.

Hereinafter, embodiments of the present disclosure will be described in detail with reference to the drawings. Note that, in each of the following embodiments, the same reference numerals are given to the same parts, and redundant description will be omitted.

First Embodiment

FIG. TA is a schematic diagram illustrating an example of an information processing system 1 of the present embodiment. The information processing system 1 is a sharing system in which a cabin of a mobile body is treated as a lending subject. FIG. 1B illustrates a cabin of a vehicle that is an example of a mobile body.

The information processing system 1 includes an information processing apparatus 10, a lender terminal 12, a user terminal 14, and a vehicle 16. The information processing apparatus 10, the lender terminal 12, the user terminal 14, and the vehicle 16 are communicably connected via a network 18 in a wireless or wired manner.

Note that FIG. TA illustrates a configuration that the information processing system 1 includes one information processing apparatus 10, one lender terminal 12, one user terminal 14, and one vehicle 16, but is an example for description. The information processing system 1 may include one or more lender terminals 12, one or more user terminals 14, and one or more vehicles 16.

The information processing apparatus 10 is an information processing apparatus that manages the entire information processing system 1. The information processing apparatus 10 mainly manages the cabin of the vehicle 16 as a lending subject. Note that the lending subject is not limited to the cabin 17. There may be a case where the vehicle 16 is lent out as a transportation means by car sharing or the like. In this case, the information processing apparatus 10 manages the vehicle 16 not only as the cabin 17 but also as a transportation means. The information processing apparatus 10 includes, for example, a server device, a cloud system, etc., but is not limited thereto.

In the present embodiment, a lender 20 and a user 22 are both users who use the sharing system. Hereinafter, as the lender 20 is the owner of the vehicle 16, the lender 20 may be described as the "owner" when distinguished from the user 22. In the present embodiment, as an example, the information processing apparatus 10 manages lending and renting of the cabin 17 between an owner who is the lender 20 of the vehicle 16 and a user who is the user 22 of the cabin 17 of the vehicle 16. A sharing transaction between the individual owner of the vehicle 16 and the user 22 may be referred to as inter-individual transaction or C2C (consumer-to-consumer) sharing. Note that the information processing system 1 is not limited to C2C sharing, and may be a system that an operating organization or the like has the vehicle 16 and the user 22 who is a member uses the vehicle.

The lender 20 is an owner who lends the vehicle 16 or an owner who wishes to lend the vehicle 16. The lender terminal 12 is a terminal device operated by the lender 20. The lender terminal 12 is an example of a "user terminal", and is, for example, a tablet terminal, a smartphone, or the like, but is not limited thereto.

The user 22 is a user who rents the cabin 17 of the vehicle 16 or a user who wishes to rent the cabin. The user terminal 14 is a terminal device operated by the user 22. The user terminal 14 is, for example, a tablet terminal, a smartphone, or the like, but is not limited thereto.

The vehicle 16 is an example of a mobile body. The mobile body refers to one used as a transportation means. The mobile body may be, for example, a passenger car, a bus, a railway (including a train), or the like. Further, the mobile body may be one that moves on water such as a ship. In addition, the mobile body may be owned by an individual or may be owned by a corporation. In the present embodiment, a passenger car will be described as an example of a mobile body. The passenger car is, for example, an ordinary passenger car, a large passenger car, or a small passenger car. In addition, the power source of the vehicle 16 is not limited. For example, the vehicle 16 may be any of a gasoline vehicle, an electric vehicle, a fuel cell vehicle, etc. In addition, the vehicle 16 may be any of a vehicle that travels through a driving operation by a person, a vehicle that can automatically travel without a driving operation by a person, and a vehicle that can autonomously travel.

The cabin refers to a space in the mobile body. Equipment depends on the mobile body, but the space is used by the user 22 to meet the purpose. The cabin 17 of the vehicle 16 illustrated in FIG. 1B as an example is a configuration of a cabin of a general passenger car, and includes a driver's seat and/or a rear seat, and the user 22 relaxes in the vacant space to meet a purpose. The setting of the space in the cabin 17 can be changed by the lender 20 of the vehicle 16 to meet the use purpose of the user 22. For example, the lender 20 can enrich video equipment and/or audio equipment, arrange a table, provide a space for taking a nap, change a pattern, or optionally change the setting to suite a male user and a female user, an age group of the user, a nationality, etc.

The vehicle 16 includes a control unit 24A, a communication unit 24B, a sensor 24C, an output unit 24D, an input unit 24E, an unlocking/locking unit 24F, and a drive unit 24G. The communication unit 24B, the sensor 24C, the output unit 24D, the input unit 24E, the unlocking/locking unit 24F, and the drive unit 24G are connected to the control unit 24A so as to be able to transmit and receive data or signals.

The control unit 24A is a dedicated or general-purpose computer, and controls the vehicle 16. The communication unit 24B is a communication interface (I/F) for communicating with other devices via the network 18.

The sensor 24C is a sensor that detects a position and/or a driving state of the vehicle 16. The sensor 24C is, for example, an inertial measurement unit (IMU), a speed sensor, a global positioning system (GPS), or the like.

The output unit 24D outputs various types of information. The output unit 24D is a speaker that outputs sound, a display that displays an image, or the like. The display is, for example, a known organic electro luminescence (EL) display, a liquid crystal display, a projection device, or the like.

The input unit 24E receives an input of an instruction or information from the user. The input unit 24E is, for example, at least one of: an instruction input device that receives input by user's operation input, and a microphone that receives voice input. The instruction input device is, for example, a button, a pointing device such as a mouse or a trackball, or a keyboard. The instruction input device may be an input function in a touch panel provided integrally with the output unit 24D that is a display.

The unlocking/locking unit 24F is a mechanism for unlocking or locking each of one or more pieces of equipment provided in the vehicle 16. When receiving key information, the unlocking/locking unit 24F brings the equipment corresponding to the key information into an unlocked state or a locked state. The unlocked state refers to a state where the equipment can be used by the user or a state where the equipment can be driven. The locked state refers to a state where the equipment cannot be used by the user or a state where the equipment cannot be driven.

The equipment is a mechanism provided in the vehicle 16. Examples of the equipment include, but are not limited to, a front window on the driver's seat side, a front window on the passenger's seat side, a rear window, an air conditioner, a front door on the driver's seat side, a front door on the passenger's seat side, audio, light, an engine, a lockable box, etc.

The drive unit 24G is a drive device mounted on the vehicle 16. The drive unit 24G is, for example, an engine, a motor, a wheel, or the like.

Next, hardware configurations of the information processing apparatus 10, the lender terminal 12, and the user terminal 14 will be described.

Figure 2A:
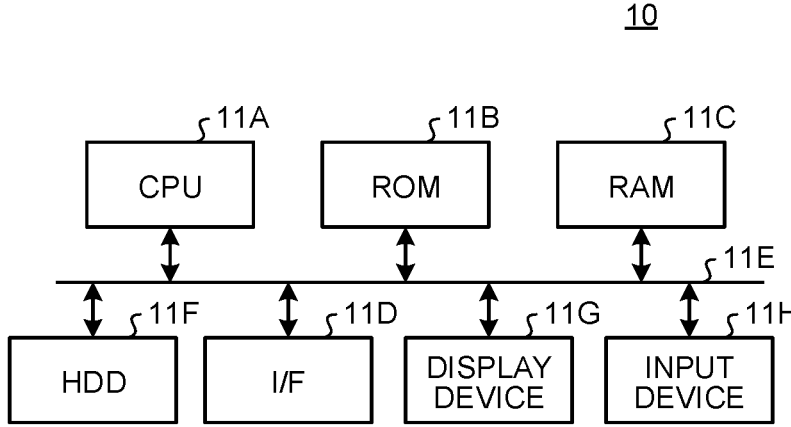
FIG. 2A is a diagram illustrating an example of a hardware configuration of an information processing apparatus according to the present embodiment.

FIG. 2A is an example of a hardware configuration diagram of the information processing apparatus 10. In the information processing apparatus 10, a central processing unit (CPU) 11A, a read only memory (ROM) 11B, a random access memory (RAM) 11C, an I/F 11D, a hard disk drive (HDD) 11F, etc. are mutually connected by a bus 11E, and a hardware configuration using a normal computer is employed. Moreover, as an example, the information processing apparatus 10 is provided with a display device 11G and an input device 11H so as to be connectable.

The CPU 11A executes a computer program and controls each unit to perform various processing. The ROM 11B stores fixed programs and/or data. The RAM 11C is used for a work area of the CPU 11A. The I/F 11D transmits and receives data. The I/F 11D is, for example, a network interface such as a local area network (LAN) board. The HDD 11F stores an operating system (OS), various programs, and data. Not only the HDD but also a solid state drive (SSD) or the like may be used.

Figure 2B:
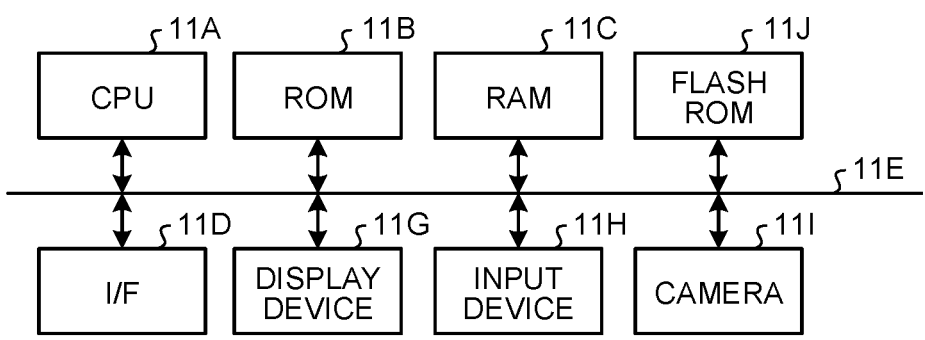
FIG. 2B is a diagram illustrating an example of a hardware configuration of the lender terminal of the present embodiment.

FIG. 2B is a diagram illustrating an example of a hardware configuration of the lender terminal 12. The hardware configuration of the user terminal 14 will be described as a hardware configuration similar to that of the lender terminal 12. The lender terminal 12 (also the user terminal 14) has a hardware configuration of a computer configuration similarly to the information processing apparatus 10. Basic components of a computer similar to those of the information processing apparatus 10 are denoted by the same reference numerals, and description thereof will be omitted. Note that the display device 11G is a display such as liquid crystal or organic EL. The input device 11H will be described as a touch panel provided on a display. The flash ROM 11J stores various programs and/or data. The lender terminal 12 (also the user terminal 14) further includes a camera 111. The camera 111 is used when augmented reality (hereinafter referred to as augmented reality (AR)) to be described later is performed. In a case where AR is not performed, it may not be included in the hardware configuration of the lender terminal 12 (also the user terminal 14).

The user downloads a predetermined application (hereinafter abbreviated as an app) from a designated site in advance, and installs the application in the lender terminal 12 and the user terminal 14. In addition, the computer program executed by each of the information processing apparatus 10, the lender terminal 12, and the user terminal 14 may be provided by being incorporated in advance in the ROM 11B or the like, or the computer program may be acquired by download from a designated site and installed and executed in the lender terminal 12 and the user terminal 14. Further, each program may be provided by being recorded in a computer-readable recording medium such as a compact disc (CD)-ROM, a flexible disk (FD), a CD-R, and a digital versatile disk (DVD) as a file in an installable format or an executable format. The information processing apparatus 10, the lender terminal 12, and the user terminal 14 each exhibit various functions by executing a computer program with the CPU 11A.

Next, functional configurations of the lender terminal 12 and the user terminal 14 will be described.

Figure 3:
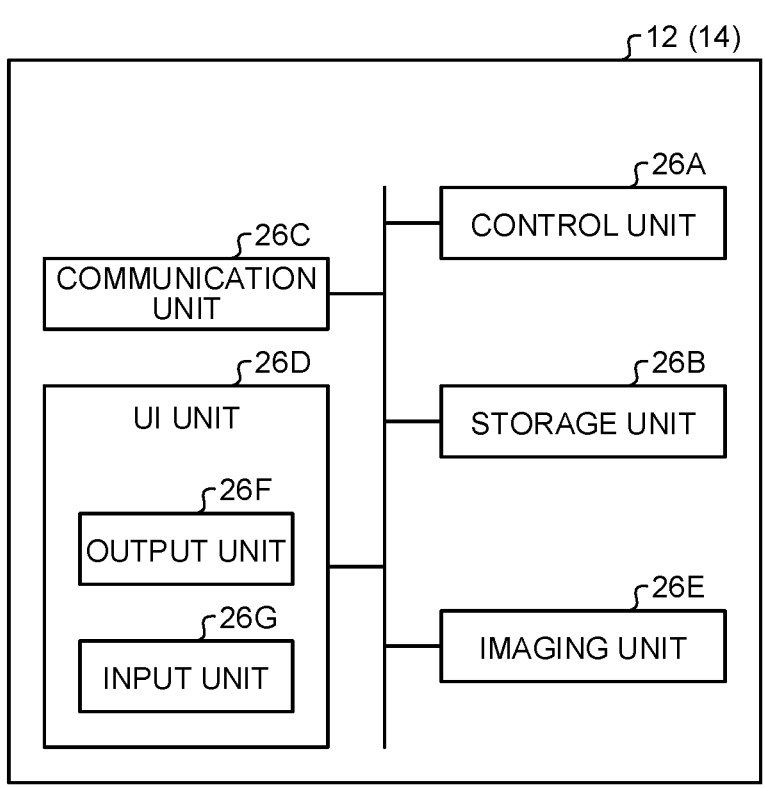
FIG. 3 is a block diagram illustrating an example of functional configurations of a lender terminal and a user terminal of the present embodiment.

FIG. 3 is a block diagram illustrating an example of functional configurations of the lender terminal 12 and the user terminal 14. The basic functions of the lender terminal 12 and the user terminal 14 are similar.

The lender terminal 12 (also the user terminal 14) includes a control unit 26A, a storage unit 26B, a communication unit 26C, a user interface (UI) unit 26D, and an imaging unit 26E.

The control unit 26A controls the entire lender terminal 12 (also the user terminal 14). The storage unit 26B stores various data.

The communication unit 26C communicates with other devices via the network 18 by the I/F 11D. The UI unit 26D includes an output unit 26F and an input unit 26G. The output unit 26F outputs display information to the display device 11G. The input unit 26G receives an operation instruction from the user from the input device 11H.

Next, a functional configuration of the information processing apparatus 10 will be described.

Figure 4:
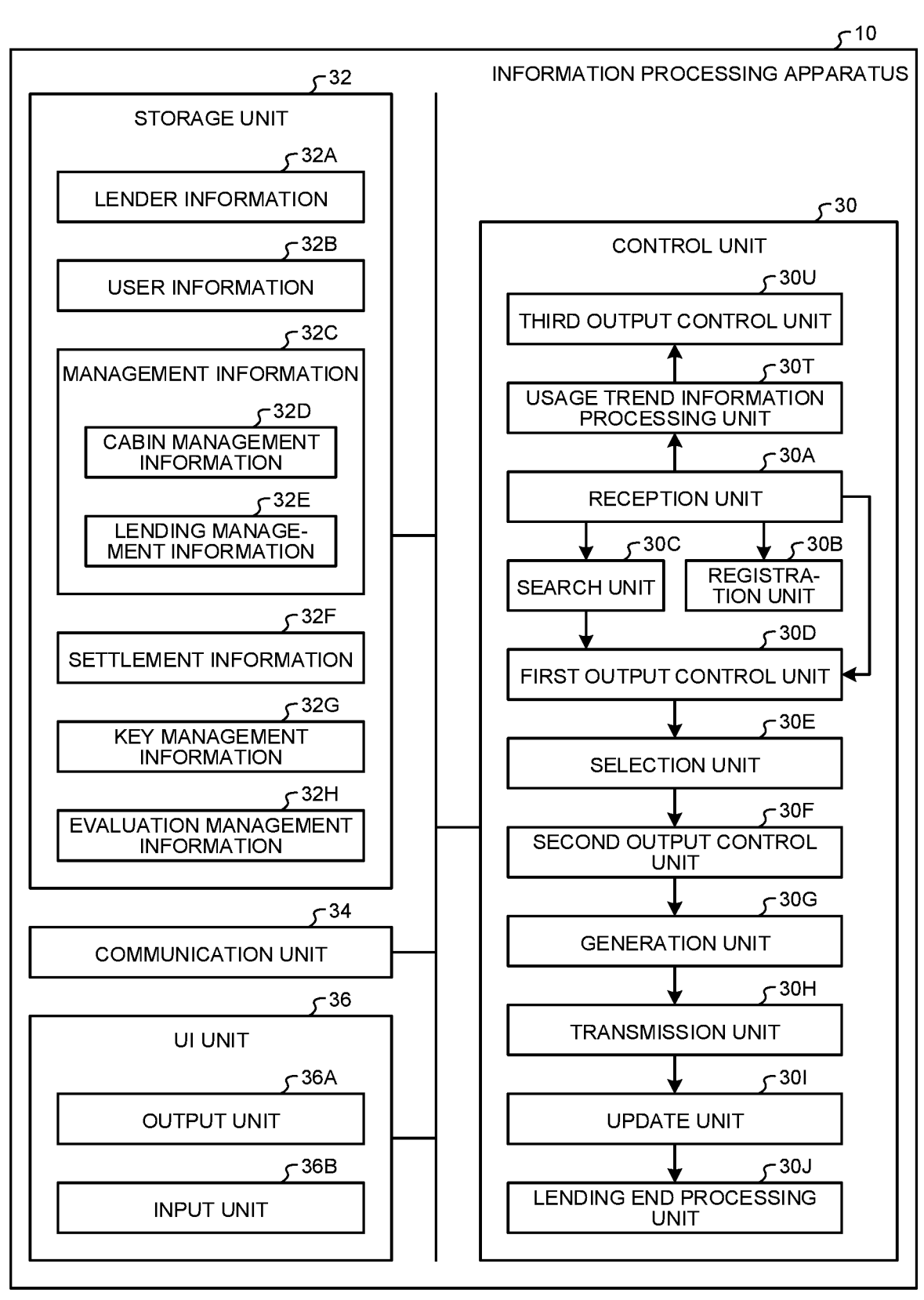
FIG. 4 is a block diagram illustrating an example of a functional configuration of an information processing apparatus according to the present embodiment.

FIG. 4 is a block diagram illustrating an example of a functional configuration of the information processing apparatus 10.

The information processing apparatus 10 includes a control unit 30, a storage unit 32, a communication unit 34, and a UI unit 36. The control unit 30 performs processing by, for example, transmitting and receiving data or signals to and from the storage unit 32, the communication unit 34, and the UI unit 36.

The communication unit 34 communicates with other devices via the network 18 by the I/F 11D. The UI unit 36 includes an output unit 36A and an input unit 36B. The output unit 36A outputs the display information to the display device 11G. The input unit 36B inputs setting data from the input device 11H such as a keyboard and a mouse.

The storage unit 32 stores lender information 32A, user information 32B, management information 32C, settlement information 32F, key management information 32G, and evaluation management information 32H.

The lender information 32A is a management table for managing information related to the lender 20. For example, the lender information 32A is a management table by which identification information of the lender 20, a name of the lender 20, a contact address of the lender 20, and identification information of the lender terminal 12 operated by the lender 20 are correlated with each other. Note that the lender information 32A may be information further including other information related to the lender 20. Additionally, the identification information of the lender 20 may be referred to as a lender identification (ID) in the description below. The identification information of the lender terminal 12 may be referred to as a lender terminal ID in the description below.

The contact address of the lender 20 is, for example, an address, a mail address, a telephone number, etc. It is assumed that the contact address of the lender 20 includes information of the contact address that can be confirmed by the lender 20 on the lender terminal 12, such as a mail address that can be received by the lender terminal 12.

The user information 32B is a management table for managing information related to the user 22. The user information 32B is, for example, a management table by which identification information of the user 22, a name of the user 22, a contact address of the user 22, feature information of the user 22, and identification information of the user terminal 14 operated by the user 22 are correlated with each other. Note that the user information 32B may be information further including other information related to the user 22.

The contact address of the user 22 is, for example, an address, a mail address, a telephone number, etc. The contact address of the user 22 includes information of the contact address that can be confirmed by the user 22 on the user terminal 14, such as a mail address that can be received on the user terminal 14. The feature information of the user 22 is an inner feature or an outer feature such as a hobby, a taste, a personality, an age, or a body shape of the user 22. The identification information of the user 22 may be referred to as a user ID in the description below. The identification information of the user terminal 14 may be referred to as a user terminal ID in the description below.

The management information 32C is information for managing the cabin 17 of the vehicle 16 as a lending subject. The information processing apparatus 10 manages the cabin 17 as a lending subject by managing the management information 32C.

The management information 32C includes cabin management information 32D and lending management information 32E. The cabin management information 32D is a management table for managing the cabin 17. The lending management information 32E is a management table for managing the lending status of the cabin 17.

FIG. 5A is a diagram illustrating an example of a data configuration of the cabin management information 32D. The cabin management information 32D is a management table by which the cabin lending information and the status are correlated with each other for each cabin 17. Specifically, the cabin management information 32D is a management table by which a cabin ID 300, cabin lending information 310, and a status 320 are correlated with each other.

The cabin ID 300 is identification information of the cabin 17. The cabin lending information 310 is information related to lending of the cabin 17 and is registered by an instruction of the lender 20. The cabin lending information 310 includes information of each of vehicle information 311, traveling possibility 312 in the lending period, lending availability 313 in the stop period, lending period information 314, and a price 315 that is a usage fee. Note that the cabin lending information 310 may be information further including other information related to lending of the cabin 17.

The vehicle information 311 is information related to the vehicle 16. The vehicle information 311 includes, for example, a lender ID 3111, a vehicle ID 3112, a vehicle type 3113, and a lending region 3114. The vehicle ID 3112 is identification information of the vehicle 16. The vehicle type 3113 is information representing a vehicle type of the vehicle 16. The lending region 3114 is a region in which the vehicle 16 including the cabin 17 is scheduled to be located when the cabin 17 is lent out. Note that the vehicle information 311 may be information further including other information related to the vehicle 16.

The traveling possibility 312 in the lending period is information representing whether or not to permit traveling of the vehicle 16 in the lending period. The traveling possibility 312 in the lending period is represented by, for example, "OK" indicating that traveling is permitted or "NG" indicating that traveling is not permitted.

The lending availability 313 in the stop period is information representing whether or not to permit the cabin 17 of the vehicle 16 to be lent to the user 22 in the stop period of the vehicle 16.

The "cabin 17 of the vehicle 16 is permitted to be lent to the user 22 in the stop period" means that "at least part of the stop period can be set as the lending period". "The cabin 17 of the vehicle 16 is not permitted to be lent to the user 22 in the stop period" means "It is impossible to set all the periods of the stop period as the lending period".

The stop period is a period during which the mobile body stops moving. The stop period is specifically a parking period or a stop period. The parking period is a period corresponding to a stop of the vehicle 16 for a predetermined time or more or a stop in a state where the driver cannot immediately drive after moving away from the vehicle 16. The stop period is a period corresponding to a stop less than a predetermined time. Further, when the mobile body is an automated driving vehicle, the stop period includes a period during which the mobile body goes around in a predetermined region.

The lending availability 313 in the stop period is represented by, for example, "OK" indicating that it is possible to lend or "NG" indicating that it is not possible to lend.

The cabin 17 of the cabin ID 300 whose lending availability 313 in the stop period corresponds to "OK" is the cabin 17 for which at least part of the stop period of the vehicle 16 can be set as the lending period. In the cabin 17 of the cabin ID 300 whose lending availability 313 in the stop period corresponds to "OK", information representing that the vehicle 16 is lent in a stopped state is set.

Additionally, the cabin 17 of the cabin ID 300 whose lending availability 313 in the stop period corresponds to "NG" is the cabin 17 for which lending in the stop period of the vehicle 16 is prohibited.

The lending period information 314 is information representing a period during which the cabin 17 can be lent out. The lending period information 314 is represented by, for example, a lending start time and a lending end time, a weekday and a holiday, a day of the week, a date, a time slot obtained by dividing one day into two or more time slots, etc. The time slots are, for example, the morning and the afternoon.

In a case where the lending availability 313 in the stop period is "OK" indicating that lending is possible, the lending period information 314 corresponding to the lending availability 313 in the stop period indicates that the period may be at least part of the stop period of the vehicle 16. In addition, in a case where the lending availability 313 in the stop period is "NG" that indicates "no lending", the lending period information 314 corresponding to the lending availability 313 in the stop period indicates that the period must not overlap with at least part of the stop period of the vehicle 16.

The control unit 30 to be described later manages the cabin 17 as a lending subject on the basis of the cabin management information 32D. Therefore, at least part of the stop period of the vehicle 16 can be set as the lending period of the cabin 17.

In addition, it is assumed that the lending availability 313 in the stop period is "OK" indicating that it is possible to lend, and the traveling possibility 312 in the lending period is "OK" indicating that traveling is permitted. In this case, the user 22 is allowed to drive the vehicle 16 in a lending period corresponding to those periods.

By the control unit 30 to be described later managing the cabin 17 as a lending subject on the basis of the cabin management information 32D, it is possible to set at least part of the stop period of the vehicle 16 as a lending period of the cabin 17 and to set to be capable of permitting traveling in the lending period.

The price 315 is information representing a usage fee per unit time at the time of lending or a usage fee fixed for a predetermined period. Note that the usage fee is not limited to a currency unit used in each country, and may be virtual currency or electronic money such as points. The usage fee registered in the cabin management information 32D is a usage fee in a state indicated by the corresponding vehicle information 311, the traveling possibility 312 in the lending period, the lending availability 313 in the stop period, and the lending period information 314.

The status 320 is information representing a reservation status of the cabin 17 identified by the corresponding cabin ID 300. For example, the status 320 is information representing reserved, in use, unreserved_lending available, or unreserved_lending unavailable. Reserved is information representing that the cabin 17 identified by the corresponding cabin ID 300 is reserved by the user 22. The "in use" is information representing that the vehicle 16 identified by the corresponding cabin ID 300 is in use by the user 22. Non-reserved_available for lending is information representing that the cabin 17 identified by the corresponding cabin ID 300 is unreserved by the user 22 and available for lending. Non-reserved_lending unavailable for lending is information representing that the cabin 17 identified by the corresponding cabin ID 300 is unreserved by the user 22 and unavailable for lending. The status 320 is updated under the control of the control unit 30 described later.

Next, a data configuration of the lending management information 32E will be described.

FIG. 5B is a diagram illustrating an example of a data configuration of the lending management information 32E.

The lending management information 32E is a management table for managing a usage status of the cabin 17. For example, the lending management information 32E is a management table by which a reservation ID 411, a cabin ID 412, a user ID 413, a reservation time 414, and a use history information 415 are correlated with each other.

The reservation ID 411 is identification information of a lending reservation. The user ID 413 is identification information of the user 22. The reservation time 414 is information representing a reservation time of the cabin 17. The use history information 415 is information representing a history of an actual usage status of the cabin 17. The lending management information 32E is updated under the control of the control unit 30 described later.

Returning to FIG. 4, the description will be continued. The settlement information 32F is a management table by which information used for settlement is registered. For example, the settlement information 32F is a management table by which the lender ID of the lender 20 is correlated with information used for settlement of the lender 20, and the user ID of the user 22 is correlated with information used for settlement of the user 22. The information used for the settlement of the lender 20 is information used at the time of fee transfer or fee payment, and is, for example, bank account information or credit card information of the lender 20. The information used for the settlement of the user 22 is information used at the time of fee transfer or payment, and is, for example, bank account information or credit card information of the user 22.

The key management information 32G is a management table for managing key information for the user to unlock or lock the equipment in the cabin 17. For example, key information for unlocking each piece of equipment is registered in the key management information 32G for each piece of equipment in the cabin 17. The key information is, for example, information such as unlocking and locking a door and/or unlocking and locking the engine start.

The evaluation management information 32H corresponds to "registration information" for registering the evaluation. As an example, the evaluation management information 32H is provided as a registration table for registering an evaluation result of at least one of the vehicle 16, the cabin 17, the lender 20, and the user 22. The evaluation result registered in the evaluation management information 32H is, for example, an evaluation result obtained by the lender 20 evaluating the user 22 and an evaluation result obtained by the user 22 evaluating at least one of the vehicle 16, the cabin 17, and the lender 20, but is not limited thereto. The evaluation management information 32H of an example illustrated in the present embodiment is information by which user information of the user 22 who uses the cabin 17, lender information of the lender 20 who lends the cabin 17, lending environment information, and evaluation information that is an evaluation result of at least one of the lender 20, the user 22, the vehicle 16, and the cabin 17 are correlated with each other. The lending environment information is information representing a lending environment, and includes information such as a date and time of lending and a place of lending.

In addition, the evaluation of the cabin 17 from the user 22 to be registered in the evaluation management information 32H may include purpose information representing a use purpose of the user 22 who actually uses the cabin 17. The information processing apparatus 10 provides a data item of "actually used purpose" in the evaluation management information 32H, and receives and registers data of the "actually used purpose" after use of the cabin 17 from the user 22.

FIG. 5C is a diagram illustrating an example of a data configuration of "actually used purpose (use purpose)" of the evaluation management information 32H. As illustrated in FIG. 5C, the information processing apparatus 10 provides a management table by which an ID number 421 (identification number 421) of the cabin 17 is correlated with coordinates 422 indicating the parking place of the vehicle 16. Then, the information processing apparatus 10 stores the ID number 421 of the cabin 17 actually used by the user 22 and a use purpose 423 received after the use to correlate with each other. In this example, latitude and longitude information is set as the coordinates 422, and use purposes such as "conference", "telephone", "diaper change", and "breast-feeding" are set as the use purposes 423. Note that the information representing the use purpose illustrated here is an example, and the present invention is not limited thereto. In addition, the information processing apparatus 10 may manage the type of the use purpose 423 by dividing the type into multiple categories in advance. When the user 22 registers the evaluation in the user terminal 14, the user may be caused to select from the categories. Moreover, the information processing apparatus 10 may allow the user 22 to optionally input the use purpose on the user terminal 14.

In a case where the user 22 is allowed to optionally input the use purpose, the information processing apparatus 10 causes a usage trend information processing unit 30T to be described later of the control unit 30 to analyze where the category belongs, and puts the use purpose 423 into a corresponding predetermined category.

Various pieces of information stored in the storage unit 32 are appropriately registered and updated by processing to be described later by the control unit 30. Details of these processing will be described later.

Note that the data formats of respective pieces of the information stored in the storage unit 32 are not limited to those held as various information tables such as a management table or a registration table.

Next, the control unit 30 will be described. The control unit 30 includes a reception unit 30A, a registration unit 30B, a search unit 30C, a first output control unit 30D, a selection unit 30E, a second output control unit 30F, a generation unit 30G, a transmission unit 30H, an update unit 30I, and a lending end processing unit 30J. Moreover, the control unit 30 includes a usage trend information processing unit 30T and a third control output unit 30U.

The reception unit 30A, the registration unit 30B, the search unit 30C, the first output control unit 30D, the selection unit 30E, the second output control unit 30F, the generation unit 30G, the transmission unit 30H, the update unit 30I, the lending end processing unit 30J, the usage trend information processing unit 30T, and the third control output unit 30U are implemented by, for example, one or more processors. For example, each of the above units may be implemented by causing a processor such as a CPU to execute a computer program, namely, implemented by software. Each of the above units may be implemented by a processor such as a dedicated integrated circuit (IC), that is, hardware. Each of the above units may be implemented by using software and hardware in combination. When multiple processors are used, each of the processors may implement one of the units, or may implement two or more of the units.

The processor reads and executes a computer program stored in a storage unit (the HDD 11F or the like) to implement the units. Note that the information processing apparatus 10 may be configured to directly incorporate the program in the circuit of the processor instead of storing the program in the storage unit (the HDD 11F or the like). In this case, the processor implements the units by reading and executing the program incorporated in the circuit.

The reception unit 30A receives various types of information from the lender terminal 12, the user terminal 14, and the vehicle 16 via the communication unit 34.

Specifically, the reception unit 30A receives, from the lender terminal 12, lender information, a usage trend request, cabin lending information, evaluation information that is an evaluation result by the lender 20, etc. Moreover, the reception unit 30A receives, from the user terminal 14, user information, use reservation information, a use request, evaluation information that is an evaluation result by the user 22, etc.

The usage trend request is a request signal for acquiring a usage trend (for example, a purpose of use) of the cabin 17 of the user 22 for each predetermined area. The predetermined area refers to each area (referred to as a unit area) obtained by dividing a map to meet a predetermined condition. The map may be map data included in the information processing apparatus 10 or map data used by the lender terminal 12. The area is set to meet each map. The usage trend request is input from the lender terminal 12 by the lender 20. The reception unit 30A may receive a request signal that district information representing a specific district is included in search conditions as the usage trend request from the lender 20.

The use reservation information is information input by the user 22 who makes a use reservation of the cabin 17. In other words, the use reservation information is a search condition of the cabin 17 desired to be used by the user 22, and is information including one or more search words. The use reservation information includes, for example, at least one search word of a date, a use start time, a use time, and a use place scheduled to use the cabin 17. Note that the use reservation information may be information further including another search word. For example, the use reservation information may be information further including search words such as a vehicle type of the vehicle 16, feature information of the lender 20 who owns the vehicle 16, and evaluation information of the vehicle 16, the cabin 17, or the lender 20.

The use request is information input by the user 22 who makes a use reservation of the cabin 17. The use request is information including: cabin lending information of the cabin 17 desired to be used by the user 22 out of one or more pieces of cabin lending information matching at least one of the search conditions indicated in the use reservation information, and a request signal for requesting use of the cabin 17.

The registration unit 30B executes registration processing such as registration of the lender information in the lender information 32A, registration of the user information in the user information 32B, and registration of the cabin lending information in the cabin management information 32D.

Upon receiving the lender information from the lender terminal 12, the registration unit 30B registers the lender information in the lender information 32A. Further, upon receiving the user information from the user terminal 14, the registration unit 30B registers the user information in the user information 32B. In addition, upon receiving the cabin lending information from the lender terminal 12, the registration unit 30B registers the cabin lending information in the cabin management information 32D.

The usage trend information processing unit 30T analyzes the past usage trend of the cabin 17 of the vehicle 16 registered in the unit area from the data of the evaluation management information 32H for each unit area of the map, and generates information representing the usage trend of the cabin 17 for each unit area. For example, the usage trend information processing unit 30T superimposes a use (purpose information) having the largest number of times of use for each unit area on a map as information representing a usage trend.

Specifically, the usage trend information processing unit 30T counts use purposes of the use purpose 423 for each unit area. Then, the usage trend information processing unit 30T compares the numbers of uses of respective use purposes, and ranks the use purposes in descending order of the number of times of use. The usage trend information processing unit 30T assigns the first rank to a usage trend with the largest number of times of use. If assuming that such a use purpose with the largest number of times of use is the "conference" in the counting result, the usage trend information processing unit 30T puts the "conference" in the first rank and displays information representing the "conference" in the corresponding area on the map. Additionally, the usage trend information processing unit 30T makes it possible to grasp, at a glance, the correspondence between the parking position of the vehicle 16 of the lender 20 and the purpose in the first rank by an icon indicating "conference" or by display with color-coding in the corresponding area.

Note that the counting method of the usage trend information processing unit 30T may be optionally set. For example, the usage trend information processing unit 30T may count the latest use purposes of the respective cabins 17 in the unit area to obtain the first-rank use purpose. Alternatively, since the usage trend is repeatedly used in the cabin 17 of the same vehicle 16, the usage trend information processing unit 30T may count use purpose of the same cabin 17 over a predetermined period such as the past one day or one week. The usage trend information processing unit 30T performs this counting for the cabins 17 of other vehicles 16 in the unit area, and counts the use purposes of all the cabins 17 in the unit area for a predetermined period. In addition, the usage trend information processing unit 30T may count data of a predetermined period from the present to the past in units of time slots, days of the week, or holidays. The usage trend information processing unit 30T performs counting every preset counting period, or performs counting every counting period, which is selectively set by appropriately receiving designation of a condition from the lender terminal 12 of the lender 20.

Note that the usage trend information processing unit 30T sets the boundaries of the unit areas of the map under a condition that, for example, the boundary does not cross a main road, a river, or a railroad included in the map data.

In addition, in a case where adjacent unit areas in each unit area have the same use purpose, such as the first-rank "conference", the usage trend information processing unit 30T may change the boundary to combine those adjacent unit areas into a single area.

In addition, the usage trend information processing unit 30T can also calculate the second or lower use of each unit area by counting use purposes. Therefore, the usage trend information processing unit 30T can also appropriately provide the ranking of the purpose ranked second or lower to the lender terminal 12. For example, the usage trend information processing unit 30T displays information representing purposes in the second rank or lower by a pop-up message or the like on the lender terminal 12 when a predetermined operation is received on the lender terminal 12 side.

In addition, the usage trend information processing unit 30T may update the information representing the use purpose of the first rank of each unit area depending on the time slot as needed. The order of use purpose varies with the time slot even in one day. Accordingly, the usage trend information processing unit 30T updates the information representing the use purpose of each unit area at predetermined timings such as the morning and the afternoon in one day, daytime and night, or every three hours. A trend of purpose also appears in counting in units of the same day of the week, holiday, etc. Therefore, the usage trend information processing unit 30T may count and update the information representing the use purpose for each day of the week and each holiday.

Figure 5D:
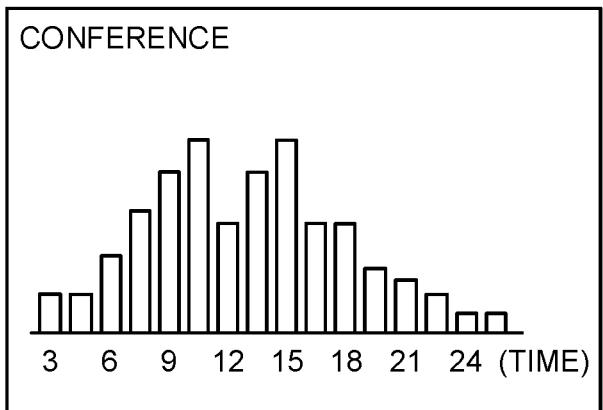
FIG. 5D is a graph illustrating a transition of past daily use purposes (conferences) of the present embodiment.
Figure 5E:
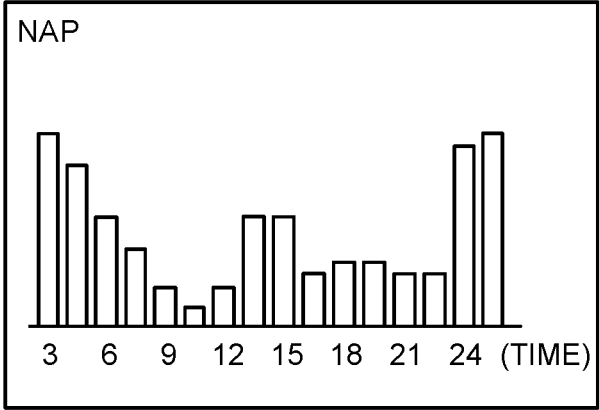
FIG. 5E is a graph illustrating a transition of past daily use purposes (naps) of the present embodiment.
Figure 5F:
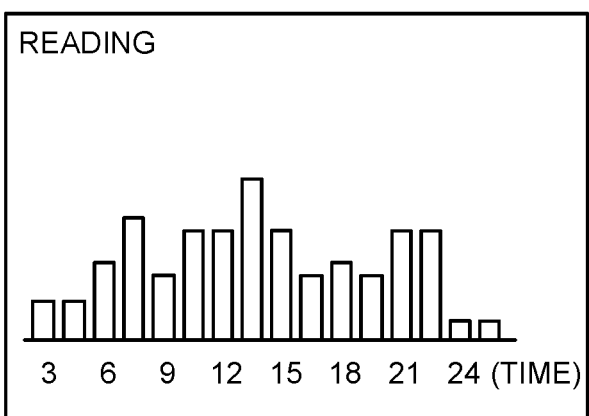
FIG. 5F is a graph illustrating a transition of past daily use purposes (reading) of the present embodiment.
Figure 5G:
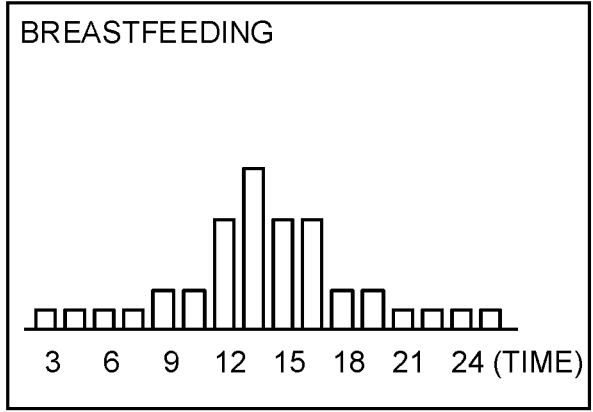
FIG. 5G is a graph illustrating a transition of past daily use purpose (breastfeeding) of the present embodiment.

FIGS. 5D to 5G are graphs illustrating the transition of past daily use purposes. In this example, a graph of the transition of the number of times of use of conference, nap, reading, and breastfeeding in one day is illustrated. As illustrated in FIG. 5D, in the counting result of the conference, it can be seen that the use is concentrated in the daytime period from the start time to the end time of work of the company. On the other hand, it can be seen that the use of the nap illustrated in FIG. 5E is concentrated in the night time slot. In addition, the reading illustrated in FIG. 5F is used on average regardless of the time slot, and it can be seen that the use of the breastfeeding illustrated in FIG. 5G is concentrated in daytime. In this manner, the time slot to be used varies with the purpose, and the number of times of counting of each use purpose and the ranks of heights of the bar graphs in FIGS. 5D to 5G are changed with the time slot. For example, in a midnight time slot from around 24:00 to around 6:00, a nap is in the first rank, and reading is in the first rank from around 21:00 to around 23:00. The usage trend information processing unit 30T creates information representing a transition with a time slot on the basis of the past use purpose. The usage trend information processing unit 30T then performs counting of each time slot and calculates ranking of the use purpose for each time slot. The usage trend information processing unit 30T updates the information representing the use purpose of the first rank of each unit area at the time slot as needed. Therefore, in the case of FIGS. 5D to 5G, reading is changed to the first rank from 21:00 to 23:00, and a nap is changed to the first rank from 24:00 to 6:00.

In addition, the usage trend information processing unit 30T may perform ranking from a ratio between the use purpose and the number of cases of troubles in the past. The usage trend information processing unit 30T does not simply count the use purposes and rank one of them with the largest number of times of use as the first rank. Instead, the usage trend information processing unit 30T counts the number of cases where troubles occurred in the use purpose, and performs ranking by taking the ratio between the number of times of use and the number of cases of troubles among them. For example, at the time of evaluation registration for the user 22 after the lender 20 has lent the cabin 17 to the user 22, if there is a trouble in the evaluation management information 32H of the information processing apparatus 10, the information processing apparatus 10 registers that there is a trouble. The information processing apparatus 10 may register specific contents of the trouble. The usage trend information processing unit 30T acquires information representing the use purpose and information representing the presence or absence of trouble from the evaluation management information 32H, counts the use purpose and the number of cases of troubles of each use purpose, and calculates a ratio of the number of troubles for each use purpose. Then, ranking of the use purpose is performed using the value of the calculated ratio of each use purpose.

Note that the usage trend information processing unit 30T may perform ranking by the number of times of use purpose, and may display the ratio of the number of cases of troubles as detailed information by a pop-up message or the like.

In addition, the usage trend information processing unit 30T may display an area having a high trouble rate as an area having a bad evaluation by color-coding with a designated color, for example. For example, in a case where the trouble rate is a constant value or more, the usage trend information processing unit 30T displays the area in a designated color indicating a district having a bad evaluation. Moreover, the usage trend information processing unit 30T may display an area in a designated color as an area having a bad evaluation in a case where it is higher by, for example, a predetermined value or more than an average, instead of a predetermined constant value.

In addition, the usage trend information processing unit 30T may notify each lender 20 of a use purpose that is likely to be highly needed, on the basis of a parking place, a vehicle type, locality of the periphery, etc. of the vehicle 16 of each lender 20. The usage trend information processing unit 30T may notify vehicle interior equipment highly evaluated in use for the purpose.

In addition, the usage trend information processing unit 30T may predict, on the basis of some of or all information such as movement of people (traffic congestion information or the like) in each district, a weather forecast, and surrounding event information for each time slot, in which area and for what purpose the need for lending increases in the next day or after several hours, and may notify each lender 20 of the information of the time slot and the date and time, the area, and the use to encourage the movement of the parking position of the vehicle 16. For example, when the information processing apparatus 10 notifies the lender terminal 12 of "there is a possibility that the need for the purpose of changing clothes or putting baggage in the vicinity of the station will increase tomorrow afternoon!" or the like, the lender 20 can move the corresponding vehicle 16 to the target area and park the vehicle.

The third output control unit 30U outputs, by superimposing on a map or the like, the usage trend information generated by the usage trend information processing unit 30T for each unit area using icons or color-coding to the output unit 26F of the lender terminal 12. For example, when the update processing is started after the usage trend information is output to the output unit 26F of the lender terminal 12, the output unit 26F of the lender terminal 12 may be notified of the usage trend information including the first-rank information after update, so as to cause the lender terminal 12 to update the display.

Figures 6A, 6B, 6C:
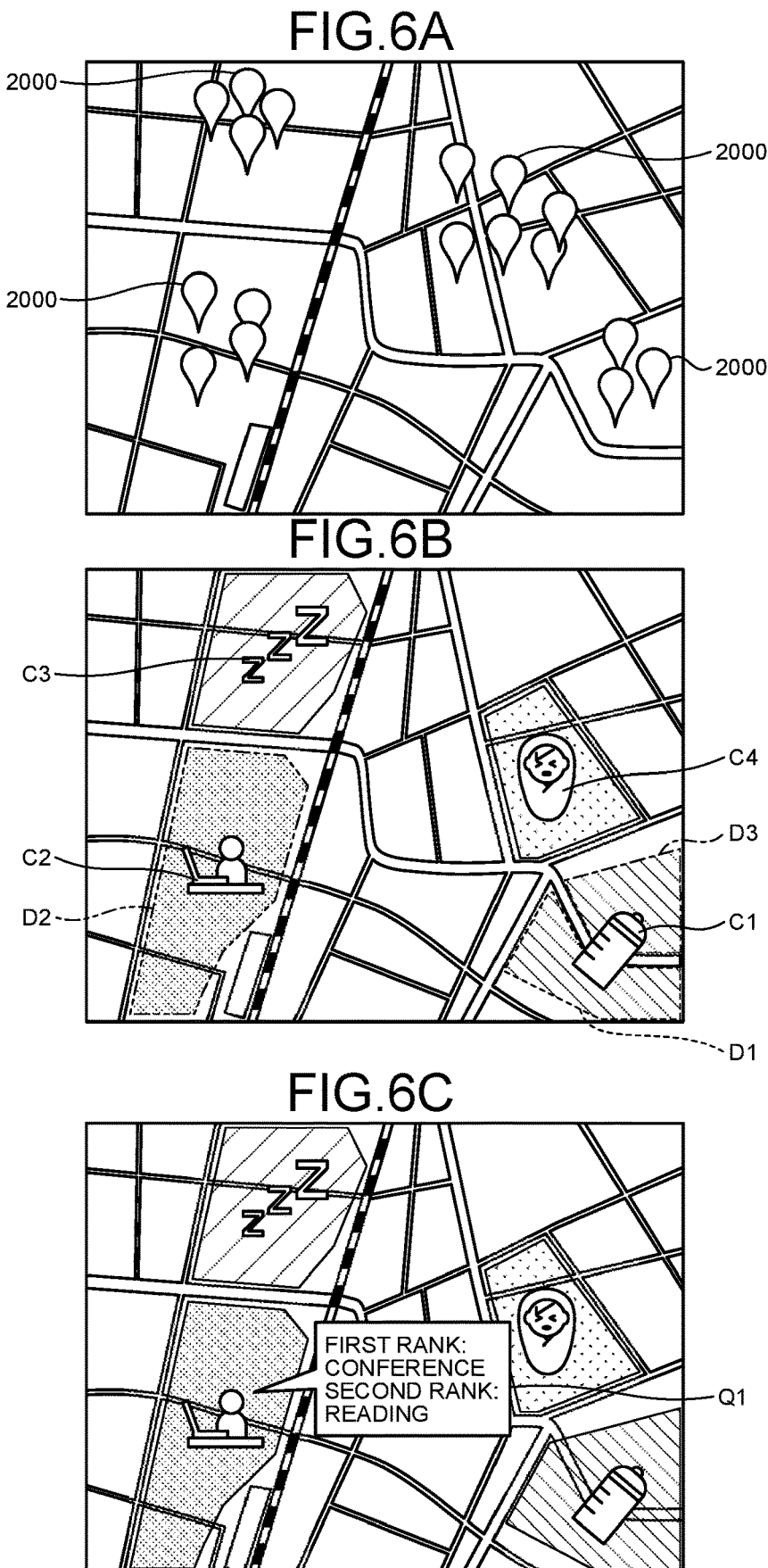
FIG. 6A is a diagram illustrating an output example of a position of a registered vehicle with respect to a lender terminal of the present embodiment.
FIG. 6B is a diagram illustrating an output example of the use purpose to the lender terminal of the present embodiment.
FIG. 6C is a diagram illustrating an output example of ranking with respect to the lender terminal of the present embodiment.

FIGS. 6A to 6C are diagrams illustrating an output example of a screen of the lender terminal 12. FIG. 6A is an example of a case where the lender 20 designates a district on the lender terminal 12 and displays the position of a registered vehicle. The registered vehicle is the vehicle 16 whose lending is registered. In FIG. 6A, the position of the registered vehicle is indicated by a balloon mark 2000. FIG. 6B illustrates an example that the usage trend is displayed for the same district. Note that the display of FIGS. 6A and 6B may be switched by a screen touch operation, a key operation, etc. on the lender terminal 12, or FIG. 6B may be displayed in a fixed manner.

In the example illustrated in FIG. 6B, the lender terminal 12 color-codes the areas so that the ranges of the areas can be seen at a glance, and displays the purpose information (icons C1 to C4) having the largest number of times of use in each area. The lender terminal 12 does not display an area in which no registered vehicle is parked in each unit area by color coding. In this case, display of the original map is maintained. In addition, in the area of breastfeeding indicated by the icon C1 of baby bottle, two unit areas adjacent to each other with a main road interposed between them are ranked first in terms of the same purpose "breastfeeding", and thus the lender terminal 12 combines the areas and displays the combined areas in the same color as one area.

FIG. 6C illustrates a display state when the display area D2 of the icon C2 is designated by a touch operation or the like on the screen on which the screen of FIG. 6B is displayed. In the display area D2 of the icon C2, each purpose is ranked. Therefore, when the display area D2 is touched, not only the purpose information of the first rank but also more detailed information is displayed by a pop-up message or the like. In this example, the lender terminal 12 displays the purpose information ranked second or lower in a pop-up Q1.

The screens of FIGS. 6B and 6C are both updated when a notice of update information is given from the information processing apparatus 10. For example, the area of breast-feeding of the icon C1 is displayed in the same color as one area by combining two unit areas D1 and D3, but in a case where the use purposes of the unit areas D1 and D3 are different due to the update, the icon and the color are displayed in different icons and colors for the unit areas D1 and D3.

The search unit 30C searches the cabin management information 32D for the cabin lending information satisfying the use reservation information received from the user terminal 14. The search unit 30C searches the cabin management information 32D for the cabin lending information that matches or is similar to one or more search words included in the use reservation information received by the reception unit 30A.

For example, it is assumed that the use reservation information received by the reception unit 30A includes the use start time and the use time scheduled to use the cabin 17. In this case, the search unit 30C searches the cabin management information 32D for the cabin lending information including the lending period in which at least part of the period overlaps with each other from the use start time until the use time elapses. The description will be continued on the assumption that the search unit 30C searches the cabin management information 32D for a plurality of pieces of cabin lending information, that is, cabin lending information corresponding to a plurality of cabin IDs.

The first output control unit 30D outputs the list information to the output unit 26F of the user terminal 14. The list information is information of the cabin 17 of the vehicle 16 that at least part of the stop period of the vehicle 16 can be set as the lending period. Specifically, the list information is information representing a list of the cabin lending information of the cabin 17 of the vehicle 16 searched by the search unit 30C. Note that the list information only needs to include one or more pieces of cabin lending information of the cabin 17.

The vehicle 16 is the vehicle 16 that at least part of the stop period can be set as the lending period. Further, the vehicle 16 may be a vehicle that at least part of the stop period is set as a lending period and can be set to be capable of permitting traveling in the lending period.

Therefore, the first output control unit 30D outputs the list information, which is a list of the cabin lending information of the cabin 17 of the vehicle 16, to the output unit 26F of the user terminal 14. In addition, the first output control unit 30D can also output the list information of the cabin 17 of the vehicle 16, which is the cabin 17 of the vehicle 16 set to be capable of permitting traveling in the lending period, to the output unit 26F of the user terminal 14.

Figure 6D:
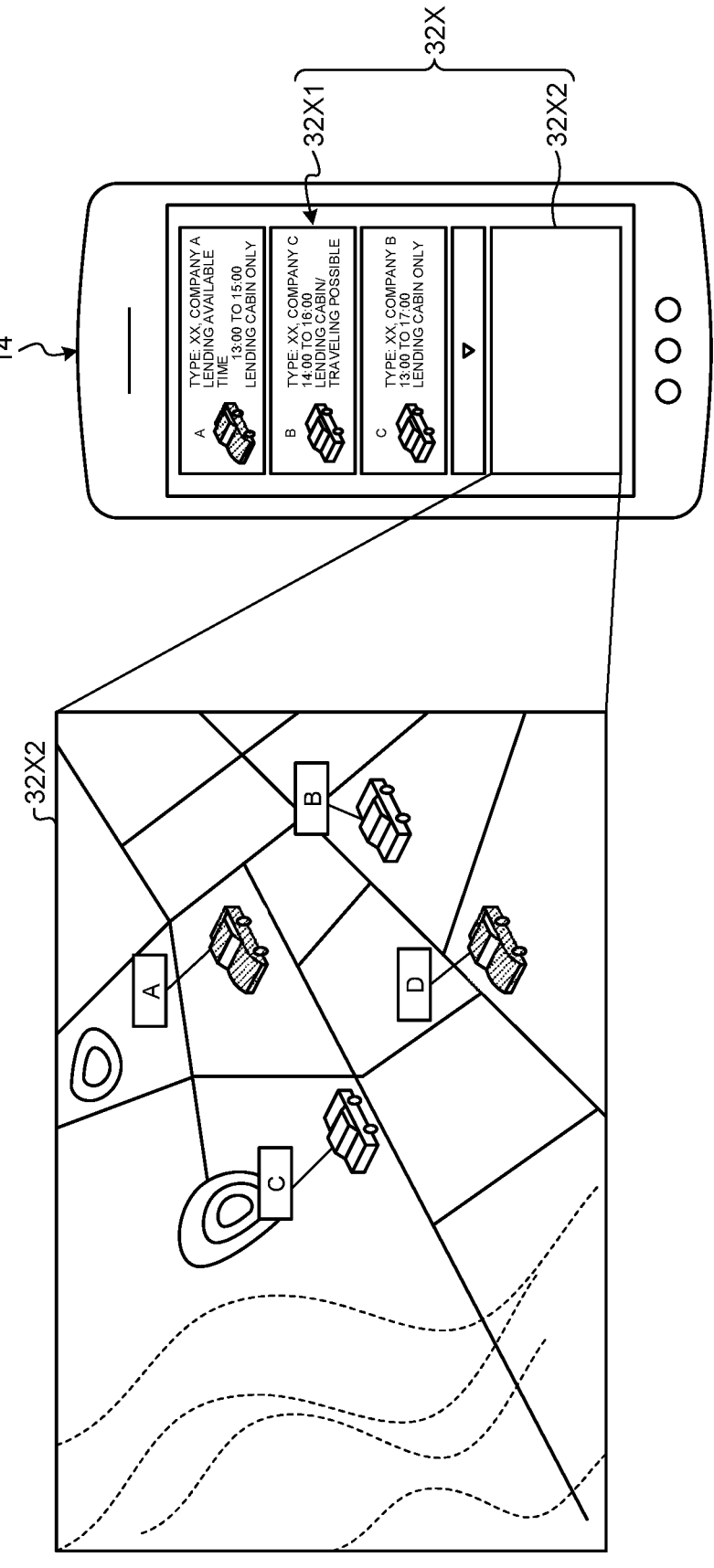
FIG. 6D is a schematic diagram illustrating an example of list information according to the present embodiment.

FIG. 6D is a schematic diagram illustrating an example of list information 32X. The list information 32X includes one or more pieces of cabin lending information searched by the search unit 30C. For example, the list information 32X includes character information 32X1 that is cabin lending information and an image 32X2 that is cabin lending information. In the image 32X2, an image indicating the corresponding cabin lending information is displayed at a position corresponding to the lending region on the map image. The image indicating the cabin lending information is displayed as, for example, an image A, an image B, an image C, and an image D schematically illustrating the vehicle 16.

The user 22 operates the user terminal 14 while making reference to the list information 32X displayed on the user terminal 14, thereby selecting one piece of cabin lending information desired to be used. Then, the user terminal 14 transmits a use request including the selected cabin lending information and a request signal for requesting use of the cabin 17 to the information processing apparatus 10.

Note that an output means for outputting the list information 32X from the first output control unit 30D only needs to be output mechanism enabling the user 22 to perform browsing of the information, and is not limited to the output unit 26F provided in the user terminal 14. For example, the first output control unit 30D may use each of various display devices connected to the network 18 as an output unit that outputs the list information 32X. The display device is, for example, a bulletin board or an electronic signboard, but is not limited thereto. The first output control unit 30D may utilizes a speaker, which is connected to the network 18 and outputs voice, as an output means for outputting the list information 32X.

Returning to FIG. 4, the description will be continued. The selection unit 30E selects the cabin lending information included in the use request received from the user terminal 14 as the cabin lending information of the cabin 17 that is the subject of lending to the user 22. That is, the selection unit 30E selects the cabin lending information of the cabin 17 that is the subject of lending to the user 22 from the cabin lending information of the cabin 17 included in the list information 32X on the basis of an instruction by the user 22.

The second output control unit 30F outputs lending availability information to the output unit 26F of the user terminal 14.

The lending availability information is information representing that the cabin 17 selected by the selection unit 30E is available for lending. The lending availability information includes, for example, at least part of information included in the cabin lending information of the cabin 17 selected by the selection unit 30E, and information representing that the cabin 17 is to be lent out.

Note that the second output control unit 30F calculates, as the actual reservation time, an overlap period between the period from the use start time included in the use reservation information received from the user terminal 14 until the use time elapses and the lending period included in the lending availability information. Then, the second output control unit 30F outputs the cabin lending information including the reservation time instead of the lending period to the user terminal 14 as the lending availability information.

In addition, the second output control unit 30F registers the user ID of the user 22 of the user terminal 14, which is the output destination of the lending availability information, the cabin ID included in the lending availability information, the calculated reservation time, and the reservation ID in the lending management information 32E, to correlate with each other (see FIG. 5B).

The user terminal 14 that has received the lending availability information displays the lending availability information on the output unit 26F of the user terminal 14. Therefore, by making reference to the user terminal 14, the user 22 can confirm the cabin lending information of the cabin 17 permitted to be used by the user 22.

Figure 7A:
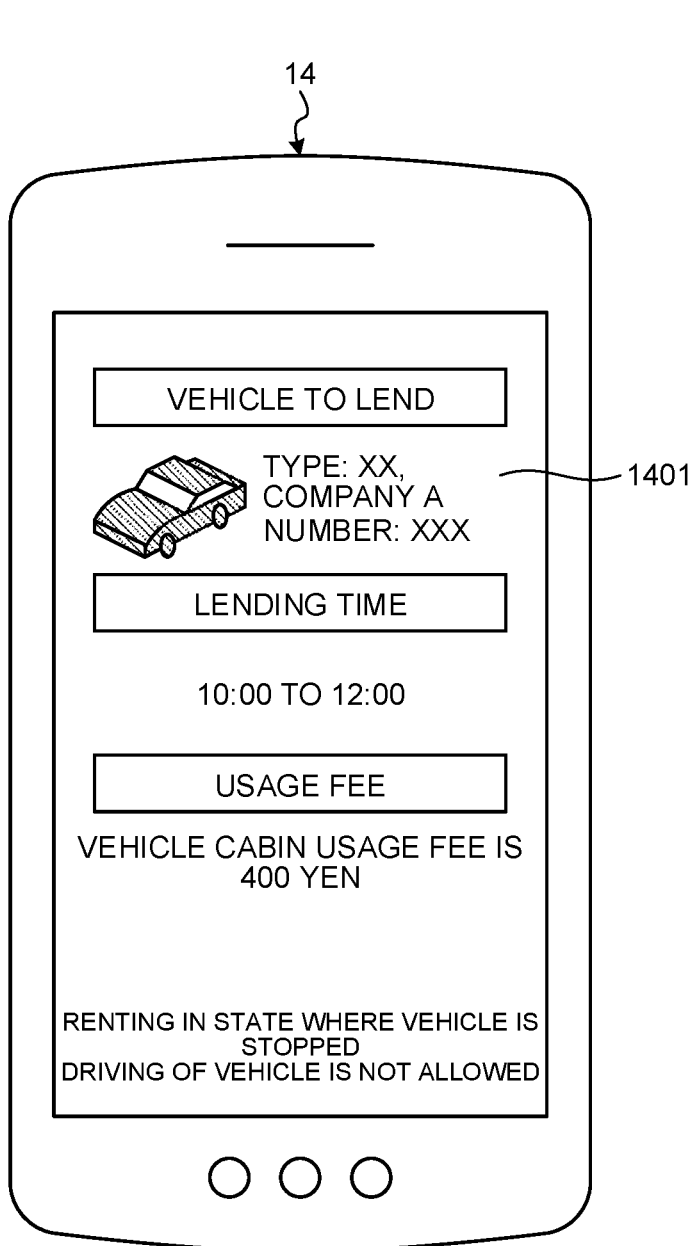
FIG. 7A is a schematic diagram illustrating an example of a screen of lending availability information output to an output unit of the user terminal of the present embodiment.
Figure 7B:
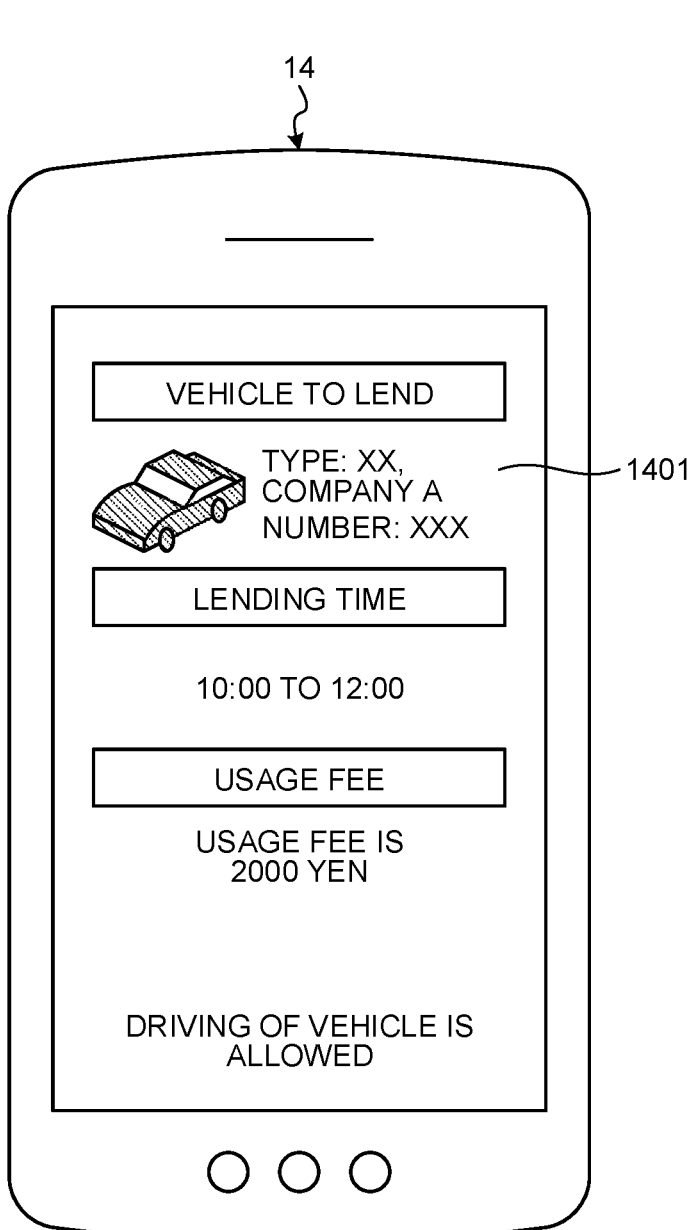
FIG. 7B is a schematic diagram illustrating an example of a screen of the lending availability information output to the output unit of the user terminal of the present embodiment.

FIGS. 7A and 7B are schematic diagrams illustrating an example of a screen of the lending availability information output to the output unit 26F of the user terminal 14.

For example, it is assumed that the cabin lending information included in the lending availability information includes "NG" as information representing traveling possibility in the lending period, and includes "OK" as information representing lending availability in the stop period. In this case, for example, the lending availability information illustrated in FIG. 7A is output to the output unit 26F of the user terminal 14.

In addition, for example, it is assumed that the cabin lending information included in the lending availability information includes "OK" as the information representing traveling possibility in the lending period, and includes "OK" as the information representing lending availability in the stop period. In this case, for example, the lending availability information illustrated in FIG. 7B is output to the output unit 26F of the user terminal 14.

As illustrated in FIGS. 7A and 7B, the usage fee may be different between a case where the vehicle 16 is lent in a stopped state (see FIG. 7A) and a case where the vehicle 16 is lent in a state where traveling is permitted (see FIG. 7B). Note that the output unit 26F of the user terminal 14 may display identification information other than the vehicle type and the number of the vehicle 16 in the item 1401 of "vehicle to lend" in FIGS. 7A and 7B. For example, the output unit 26F of the user terminal 14 may display "vehicle A", "vehicle B", "white vehicle", "red one box", etc. When the display is performed in this manner, the vehicle 16 may be easily identified for the user 22.

Returning to FIG. 4, the description will be continued. Note that, as described above, the lending region included in the cabin lending information registered in the cabin management information 32D is a region where the vehicle 16 including the cabin 17 is scheduled to be located when the cabin 17 is lent out. Therefore, in a case where the subject of lending to the user 22 is selected by the selection unit 30E, the information processing apparatus 10 preferably notifies the user 22 of information representing the actual lending position of the vehicle 16.

Accordingly, the second output control unit 30F preferably transmits selection information to the lender terminal 12 before outputting the lending availability information to the output unit 26F of the user terminal 14. The selection information is information including at least an input instruction signal of parking lot information. For example, the selection information includes the cabin lending information of the cabin 17 selected by the selection unit 30E and the input instruction signal of the parking lot information.

The parking lot is a region having a size of one vehicle 16. The parking lot information is information representing a parking lot in the lending region of the vehicle 16 having the cabin 17 selected by the selection unit 30E.

When the lender terminal 12 receives the selection information, the lender 20 of the lender terminal 12 inputs the parking lot information representing the position where the vehicle 16 owned by the lender 20 is actually parked. In this case, for example, the lender terminal 12 displays an input screen for receiving input of a parking lot on the lender terminal 12.

Figure 8:
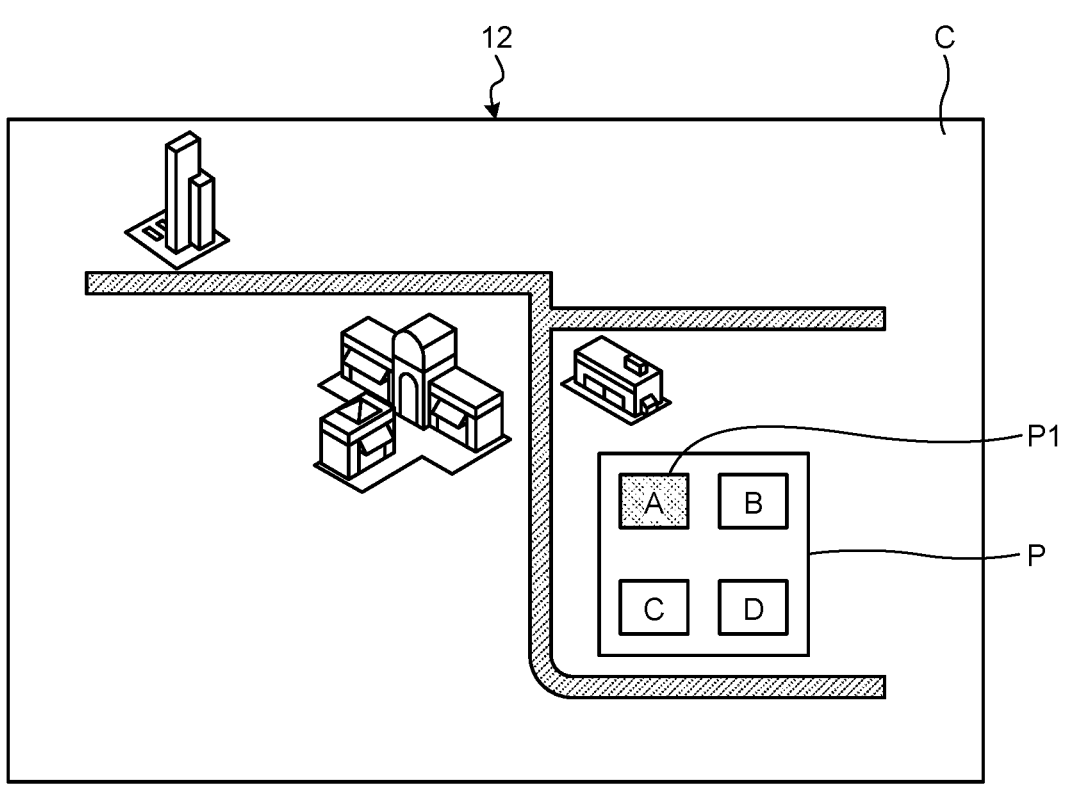
FIG. 8 is a schematic diagram illustrating an example of an input screen for receiving input of a parking lot, displayed on the lender terminal of the present embodiment.

FIG. 8 is a schematic diagram illustrating an example of an input screen for receiving input of a parking lot displayed on the lender terminal 12. For example, the lender 20 inputs, through the lender terminal 12, an instruction for the parking lot P1 where the vehicle 16 is actually parked in the lending region P. The lender terminal 12 transmits, to the information processing apparatus 10, the parking lot information of the parking lot P1 for which the instruction has been input.

Returning to FIG. 4, the description will be continued. The second output control unit 30F of the information processing apparatus 10 receives the parking lot information from the lender terminal 12 via the reception unit 30A and the communication unit 34. Then, the second output control unit 30F outputs the lending availability information further including the parking lot information received from the lender terminal 12 to the user terminal 14.

Next, the generation unit 30G will be described. The generation unit 30G generates key information. The generation unit 30G generates key information for making the cabin 17 used by the user 22 usable. The transmission unit 30H transmits the key information generated by the generation unit 30G to the user terminal 14 to which the generation unit 30G has output the lending availability information immediately before. The user terminal 14 that has received the key information stores the received key information.

The update unit 30I updates the lending management information 32E. The update unit 30I detects an actual usage status of the cabin 17 in the use period by the user 22, and registers the usage status as the use history information in the lending management information 32E. The actual usage status of the cabin 17 includes, for example, position information of the vehicle 16 detected by the sensor 24C of the vehicle 16, operating states of various electronic devices mounted on the vehicle 16, etc.

The control unit 24A of the vehicle 16 detects the usage status of the cabin 17 by analyzing the signals output from the sensor 24C, the input unit 24E, and the drive unit 24G by a known method, and transmits the detection result to the information processing apparatus 10. The update unit 30I of the information processing apparatus 10 receives the detection result from the vehicle 16 via the reception unit 30A and the network 18. Then, the update unit 30I registers the received detection result in the lending management information 32E as the use history information.

The lending end processing unit 30J executes a lending end processing. The lending end processing is processing executed at the end of use of the cabin 17 by the user 22. The lending end processing includes, for example, an end time notification processing, a key information invalidation processing, a fee calculation processing, a settlement processing, an evaluation processing, etc.

For example, the lending end processing unit 30J notifies at least one of the user terminal 14 and the vehicle 16 of the end time of the reservation time as the end time notification processing. Specifically, the lending end processing unit 30J makes reference to the lending management information 32E. When a predetermined time before the end time of the reservation time registered in the lending management information 32E comes, the lending end processing unit 30J notifies the user terminal 14 of the user 22 identified by the user ID corresponding to the reservation time of the end time of the reservation time. Note that the lending end processing unit 30J may notify the vehicle 16 identified by the cabin ID corresponding to the reservation time of the end time of the reservation time.

At least one of the user terminal 14 and the vehicle 16 that has received the end time of the reservation time outputs information representing the end time. Therefore, the end time of the reservation time is provided to the user 22 who is using the cabin 17 of the vehicle 16.

Moreover, for example, the lending end processing unit 30J performs the key information invalidation processing by invalidating the key information transmitted to the user terminal 14 so as to be in a state that switching to the unlocked state of the equipment of the vehicle 16 is impossible.

Moreover, for example, the lending end processing unit 30J calculates the fee from the time from the start of use to the end of use and the usage fee registered in the cabin management information 32D as the fee calculation processing. Then, the lending end processing unit 30J transmits fee information of the calculated fee to the user terminal 14 and the lender terminal 12. Then, the lending end processing unit 30J executes the settlement processing such as direct debit of the calculated fee of the fee information from a bank account of the user 22 and transfer to the bank account of the lender 20.

Moreover, for example, the lending end processing unit 30J receives the evaluation information from each of the lender terminal 12 and the user terminal 14 and registers the evaluation information in the evaluation management information 32H as the evaluation processing. At this time, the lending end processing unit 30J registers the user information of the user 22 who has used the cabin 17, the lender information of the lender 20 who has lent the cabin 17, the lending environment information, and the received evaluation information of at least one of the lender 20, the user 22, the vehicle 16, and the cabin 17 in the evaluation management information 32H, to correlate with each other. Therefore, information of lending and renting between the lender 20 and the user 22 is registered and managed in the evaluation management information 32H together with each piece of evaluation information.

Next, an example of a flow of information processing executed by the information processing system 1 will be described. First, a flow of registration processing by the registration unit 30B will be described.

Figure 9A:
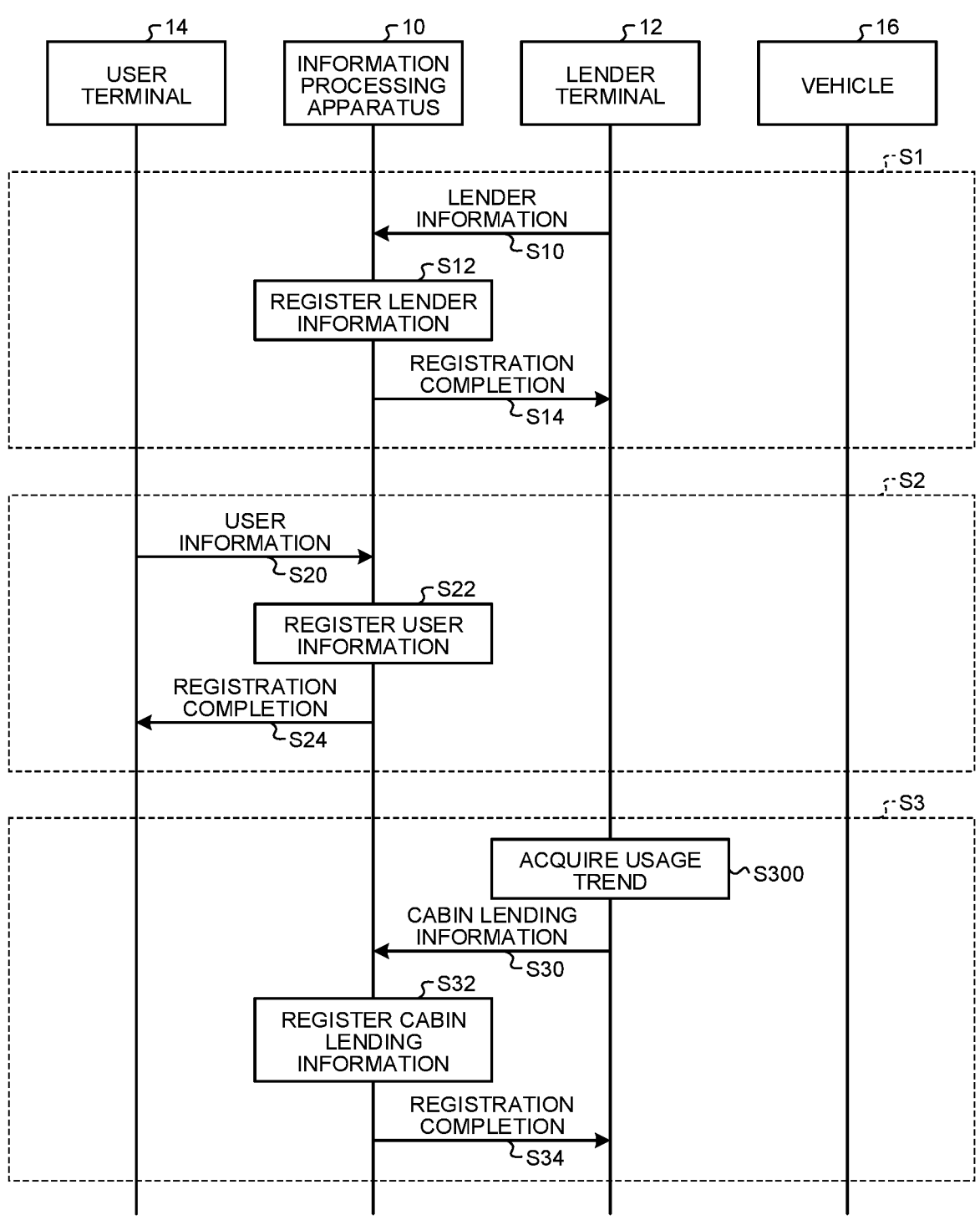
FIG. 9A is a sequence diagram illustrating an example of a flow of registration processing executed in the information processing system of the present embodiment.

FIG. 9A is a sequence diagram illustrating an example of a flow of registration processing executed in the information processing system 1.

First, the registration processing of the lender information (step S1) will be described. The lender 20 operates the lender terminal 12 to input the lender information including the name of the lender 20, the contact address of the lender 20, etc. The lender terminal 12 transmits the input lender information to the information processing apparatus 10 via the network 18 (step S10). The registration unit 30B of the information processing apparatus 10 registers the lender information received from the lender terminal 12 so as to correlate with the lender ID of the lender 20 in the lender information 32A (step S12). Then, the registration unit 30B of the information processing apparatus 10 transmits information representing registration completion to the lender terminal 12 (step S14).

The lender information is input by each of one or more lenders 20 operating each of the lender terminals 12. Then, every time the lender information is input to the lender terminal 12, the information processing system 1 executes the registration processing of the lender information (step S1).

Next, registration processing of the user information (step S2) will be described. The user 22 operates the user terminal 14 to input the user information including the name of the user 22, the contact address of the user 22, the feature information of the user 22, etc. The user terminal 14 transmits the input user information to the information processing apparatus 10 via the network 18 (step S20). The registration unit 30B of the information processing apparatus 10 registers the user information received from the user terminal 14 in the user information 32B to correlate with the user ID of the user 22 (step S22). Then, the registration unit 30B of the information processing apparatus 10 transmits information representing registration completion to the user terminal 14 (step S24).

The user information is input by each of one or more users 22 operating each user terminal 14. Then, every time the user information is input to the user terminal 14, the information processing system 1 executes user information registration processing (step S2).

Figure 9B:
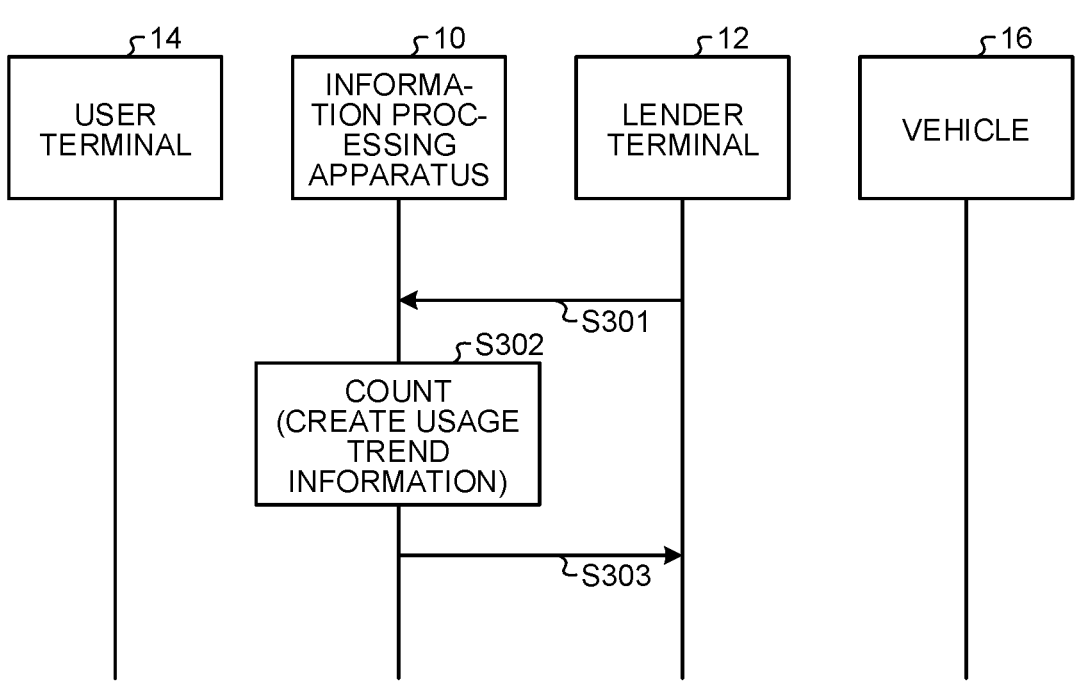
FIG. 9B is a sequence diagram illustrating an example of a flow of processing of examining a usage trend of the cabin according to the present embodiment.

Next, the registration processing of the cabin lending information (step S3) will be described. When registering the cabin lending information, the lender 20 first checks the usage trend of the cabin 17 using the lender terminal 12 (S300). Specifically, as illustrated in FIG. 9B, the lender 20 requests the information processing apparatus 10 for the usage trend of the cabin 17 by operating the lender terminal 12 and inputting conditions such as the district and the counting period (S301). Upon receiving the request for the usage trend, the information processing apparatus 10 specifies the vehicles 16 included in the designated district from the data of the evaluation management information 32H, that is, the data of FIG. 5C under the condition designated together with the request for the usage trend, divides the designated district into unit areas based on the map information, and counts the purpose (purpose information) using the cabin 17 for each unit area (S302). Then, the information processing apparatus 10 superimposes icons of uses (purpose information) ranked on the basis of the counting result on each area, and transmits display information generated by color-coding each area, or the like to the lender terminal 12 as the request source (S303). The lender terminal 12 displays the display information transmitted from the information processing apparatus 10, and the lender 20 confirms the usage trend around the parking position of the own vehicle 16 from the display result.

Subsequently, the lender 20 inputs the cabin lending information by operating the lender terminal 12. Specifically, the lender 20 operates the lender terminal 12 to input each of the vehicle information, traveling possibility in the lending period, lending availability in the stop period, the lending period, and the usage fee. Information suitable for the usage trend can also be input as the vehicle information. For example, in a case where the first rank of use purpose is "reading", information such as a reading stand and the presence of music CDs optimal for reading can be included in the vehicle information. The lender 20 prepares by arranging a reading stand or arranging music CDs for reading in the actual vehicle 16.

The lender terminal 12 transmits the input cabin lending information to the information processing apparatus 10 via the network 18 (step S30). The registration unit 30B of the information processing apparatus 10 registers the cabin lending information received from the lender terminal 12 in the cabin management information 32D to correlate with the cabin ID of the cabin 17 (step S32). Then, the registration unit 30B of the information processing apparatus 10 transmits information representing registration completion to the lender terminal 12 (step S34).

The cabin lending information is input by each of one or more lenders 20 operating each lender terminal 12. Then, every time the cabin lending information is input to the lender terminal 12, the information processing system 1 executes registration processing of the cabin lending information (step S3).

Next, the flow of the use start processing from the input of the use reservation information from the user terminal 14 to the start of use of the cabin 17 will be described.

Figure 10:
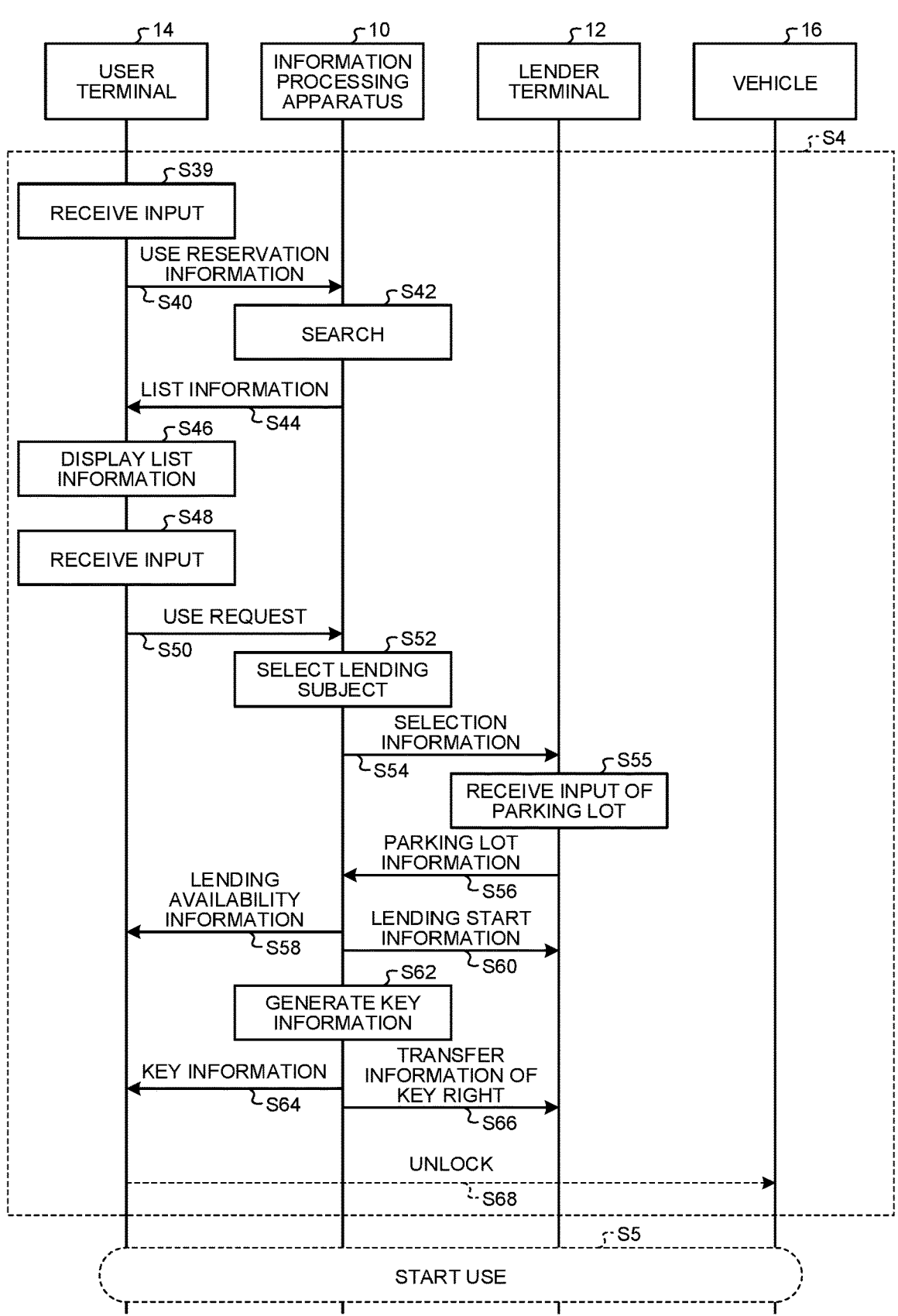
FIG. 10 is a sequence diagram illustrating an example of a flow of a use start processing (step S4) executed in the information processing system of the present embodiment.

FIG. 10 is a sequence diagram illustrating an example of a flow of the use start processing (step S4) executed by the information processing system 1.

By operating the user terminal 14, the user 22 inputs the use reservation information that is a search condition of the cabin 17 desired to be used by the user 22 and is information including one or more search words. As described above, the search words are the use start time, the use time, the use place, etc., each being scheduled to use the cabin 17. The user terminal 14 receives input of the use reservation information by the user 22 (step S39). The user terminal 14 transmits the received use reservation information to the information processing apparatus 10 (step S40). The search unit 30C of the information processing apparatus 10 searches the cabin management information 32D for the cabin lending information satisfying the use reservation information received from the user terminal 14 (step S42).

The first output control unit 30D transmits the list information 32X, which is a list of the cabin lending information searched by the search unit 30C, to the user terminal 14 (step S44). The user terminal 14 outputs the list information 32X to the output unit 26F of the user terminal 14 (step S46) (see FIG. 6D).

The user 22 operates the user terminal 14 while making reference to the list information 32X displayed on the user terminal 14, thereby selecting one piece of the cabin lending information desired to be used. The user terminal 14 receives input of the selected cabin lending information (step S48). The user terminal 14 transmits a use request including the received cabin lending information and a request signal for requesting use of the cabin 17 to the information processing apparatus 10 (step S50).

The selection unit 30E of the information processing apparatus 10 selects the cabin lending information included in the use request received in step S50 as the cabin lending information of the cabin 17 that is the lending subject (step S52).

The selection unit 30E of the information processing apparatus 10 transmits selection information including the cabin lending information of the cabin 17 selected in step S52 and the input instruction signal of the parking lot information to the lender terminal 12 of the lender 20 identified by the lender ID included in the cabin lending information (step S54).

When the lender terminal 12 receives the selection information, the lender 20 of the lender terminal 12 inputs the parking lot information representing the position where the vehicle 16 owned by the lender 20 is actually parked. For example, the lender terminal 12 displays an input screen for receiving input of the parking lot on the lender terminal 12 (see FIG. 8). Upon receiving input of a parking lot (step S55), the lender terminal 12 transmits the parking lot information of the received parking lot to the information processing apparatus 10 (step S56).

The second output control unit 30F of the information processing apparatus 10 transmits, to the user terminal 14, the lending availability information including the parking lot information received in step S56 and indicating that the cabin 17 selected by the selection unit 30E in step S52 is available for lending (step S58). The user terminal 14 outputs the lending availability information to the output unit 26F of the user terminal 14 (step S60) (see FIGS. 7A and 7B).

Next, the generation unit 30G of the information processing apparatus 10 generates key information (step S62). Then, the transmission unit 30H of the information processing apparatus 10 transmits the key information generated in step S62 to the user terminal 14 that has transmitted the lending availability information in step S58 (step S64). The user terminal 14 that has received the key information stores the received key information. In addition, the transmission unit 30H of the information processing apparatus 10 transmits, to the lender terminal 12, transfer information representing that key right has been transferred to the user 22 (step S66).

When the key information is communicated between the user terminal 14 and the vehicle 16, the equipment in the cabin 17 of the vehicle 16 is unlocked (step S68). Therefore, the cabin 17 specified by the lending availability information received from the information processing apparatus 10 in step S58 becomes available to the user 22.

For example, when the user 22 brings the user terminal 14 close to the vehicle 16 in the cabin 17 permitted to be used, communication between the user terminal 14 and the vehicle 16 is executed by a known technology, and equipment such as a door of the cabin 17 of the vehicle 16 is unlocked. Therefore, the user 22 can start using the cabin 17 and can start using the cabin 17.

Specifically, for example, when the user 22 brings the user terminal 14 close to the cabin 17, the key information of the user terminal 14 is transmitted to the vehicle 16 by near field communication between the user terminal 14 and the vehicle 16. The control unit 24A of the vehicle 16 authenticates whether or not the received key information is valid key information by a known method, and when the received key information is valid key information, the equipment corresponding to the key information is unlocked. For example, the control unit 24A switches the unlocking/locking unit 24F corresponding to a door, which is an example of equipment corresponding to the key information, to the unlocked state. This processing allows the user 22 to enter the cabin 17. Then, the use start processing (step S4) ends. Therefore, the use of the cabin 17 by the user 22 is started (step S5).

Next, a flow of an update processing of the use history information and the lending end processing will be described.

Figure 11:
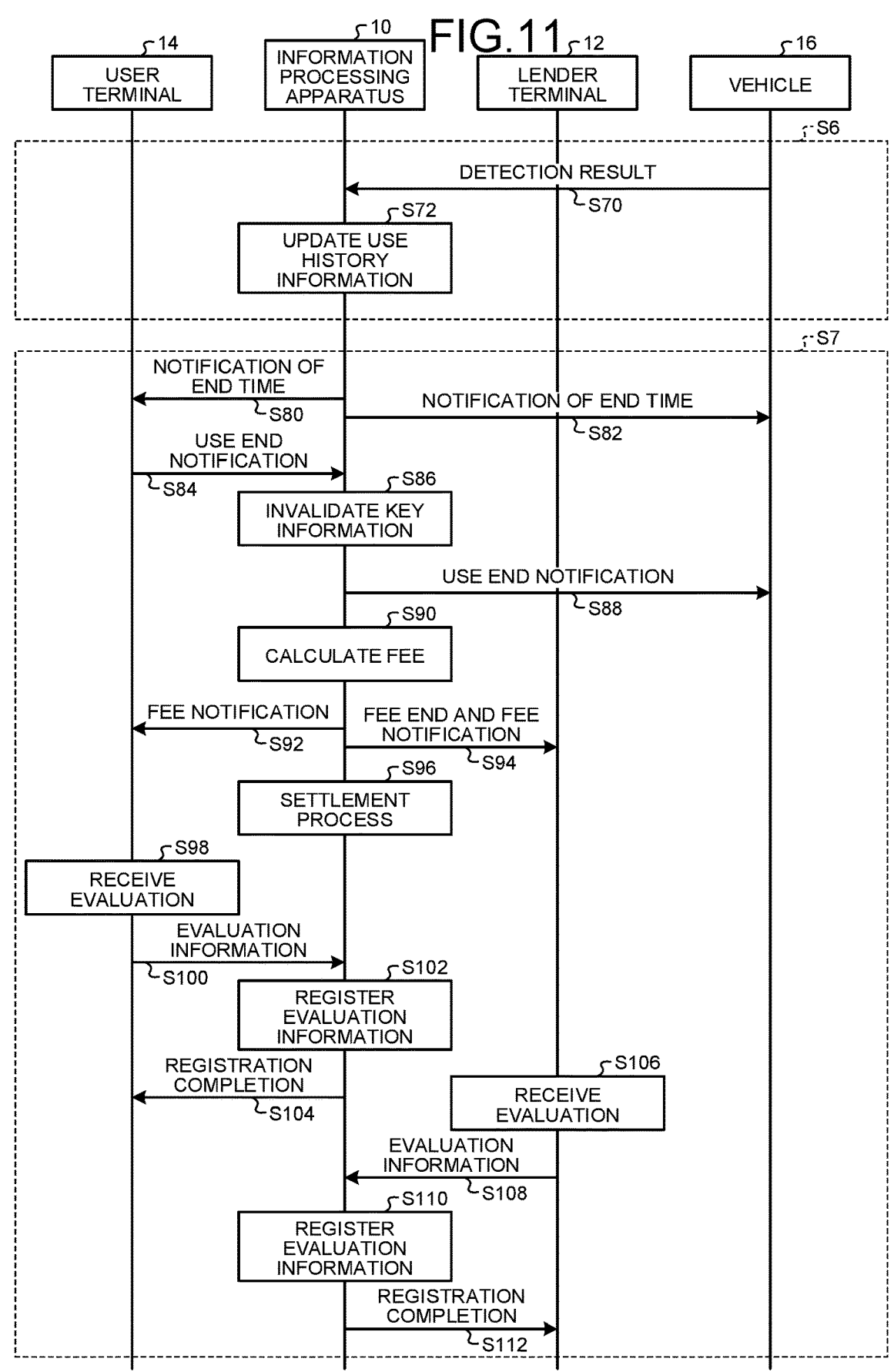
FIG. 11 is a sequence diagram illustrating an example of a flow of a use history information update processing (step S6) and a lending end processing (step S7) executed by the information processing system of the present embodiment.

FIG. 11 is a sequence diagram illustrating an example of flows of the update processing of the use history information (step S6) and the lending end processing (step S7) executed by the information processing system 1.

The processing of updating the use history information (step S6) includes processing of steps S70 to S72.

First, when the use of the cabin 17 by the user 22 is started, the control unit 24A of the vehicle 16 acquires the detection result of the usage status including the position information of the vehicle 16 detected by the sensor 24C of the vehicle 16, the operating state of each of the various electronic devices mounted on the vehicle 16, etc. The control unit 24A of the vehicle 16 only needs to acquire the detection result every predetermined time or every time the situation changes. Then, the control unit 24A of the vehicle 16 transmits the detection result of the usage status of the cabin 17 to the information processing apparatus 10 (step S70).

The update unit 30I of the information processing apparatus 10 registers the detection result received in Step S70 in the lending management information 32E as the use history information (step S72) (see FIG. 5B). The update unit 30I only needs to register the detection result in the lending management information 32E as the use history information every time the detection result is received from the vehicle 16. Therefore, the lending management information 32E is updated in the use period.

Next, the lending end processing (step S7) will be described. The lending end processing (step S7) includes processing of steps S80 to S112.

The lending end processing unit 30J of the information processing apparatus 10 notifies the user terminal 14 and the vehicle 16 of the end time of the reservation time (steps S80 and S82).

The user terminal 14 that has received the end time of the reservation time outputs information representing the end time to the output unit 26F of the user terminal 14. Therefore, the user 22 who is using the cabin 17 of the vehicle 16 inputs the end of use of the cabin 17 by operating the user terminal 14. Upon receiving the operation instruction of the use end, the user terminal 14 transmits a use end notification to the information processing apparatus 10 (step S84).

Upon receiving the use end notification, the lending end processing unit 30J of the information processing apparatus 10 performs the key information invalidation processing of invalidating the key information (step S86). Then, the lending end processing unit 30J of the information processing apparatus 10 transmits the use end notification of the cabin 17 to the vehicle 16 (step S88). The control unit 24A of the vehicle 16 that has received the use end notification switches the equipment of the vehicle 16 from the unlocked state to the locked state by controlling the unlocking/locking unit 24F.

The lending end processing unit 30J of the information processing apparatus 10 executes the fee calculation processing and calculates the fee from the time from the start of use to the end of use and the usage fee registered in the cabin management information 32D (step S90). Then, the lending end processing unit 30J of the information processing apparatus 10 transmits fee information of the calculated fee to the user terminal 14 (step S92). Further, the lending end processing unit 30J of the information processing apparatus 10 transmits fee information of the calculated fee and the information representing the end of use to the lender terminal 12 (step S94).

Next, the lending end processing unit 30J of the information processing apparatus 10 executes the settlement processing such as direct debit of the fee of the fee information calculated in step S90 from the bank account of the user 22 and transfer to the bank account of the lender 20 (step S96).

The user terminal 14 that has received the use end notification receives operation input of the evaluation information from the user 22 (step S98). For example, the user 22 who has used the cabin 17 operates the user terminal 14 to input evaluation information obtained by evaluating at least one of the vehicle 16, the cabin 17, and the lender 20 that have been used. In addition, the user 22 operates the user terminal 14 to input a use purpose of actually using the cabin 17. The use purpose may be optionally input by the user 22, or use purposes categorized in advance may be displayed and the use purpose may be selected and input by the user 22 therefrom.

The user terminal 14 transmits the received evaluation information to the information processing apparatus 10 (step S100). The lending end processing unit 30J of the information processing apparatus 10 registers the evaluation information received from the user terminal 14 in the evaluation management information 32H to correlate with each of the vehicle ID of the corresponding vehicle 16, the cabin ID of the cabin 17, and the lender ID of the lender 20 (step S102). Therefore, the use purpose (purpose information) is registered so as to correlate with the ID number (identification number) of the cabin 17 of the evaluation management information 32H and the parking place (coordinates) of the vehicle 16. Then, the lending end processing unit 30J of the information processing apparatus 10 transmits information representing registration completion of the evaluation information to the user terminal 14 (step S104). Note that the use purpose registered in the evaluation management information 32H changes with the user 22, the use time slot, or the like when the same cabin is used again. Therefore, in this example, the registered use purpose is managed in time series for each cabin ID.

In addition, the lender 20 who has lent the cabin 17 inputs the evaluation information of the user 22 who has used the lent cabin 17 by operating the lender terminal 12. The lender terminal 12 receives operation input of the evaluation information from the lender 20 (step S106). For example, the lender 20 who has lent the cabin 17 inputs the evaluation information of the user 22 who has used the lent cabin 17 by operating the lender terminal 12. The lender terminal 12 transmits the received evaluation information to the information processing apparatus 10 (step S108). The lending end processing unit 30J of the information processing apparatus 10 registers the evaluation information received from the lender terminal 12 in the evaluation management information 32H to correlate with the user ID of the corresponding user 22 (step S110). Then, the lending end processing unit 30J of the information processing apparatus 10 transmits information representing registration completion of the evaluation information to the lender terminal 12 (step S112).

Second Embodiment

In the first embodiment described above, the usage fee of the cabin 17 is illustrated as a fixed fee. However, the usage fee may be changed as needed. Utility of the cabin 17 largely depends on the surrounding environment of the stopping place and the cabin equipment. The demand for the cabin 17 largely depends on the time slot of the day. That is, for matching between the lender 20 and the user 22, it is necessary to present an appropriate price at an appropriate timing. In addition, there is a case where the user 22 performs use different from that at the time of the first contract. In the second embodiment, the price of the cabin 17 is varied.

Figure 12:
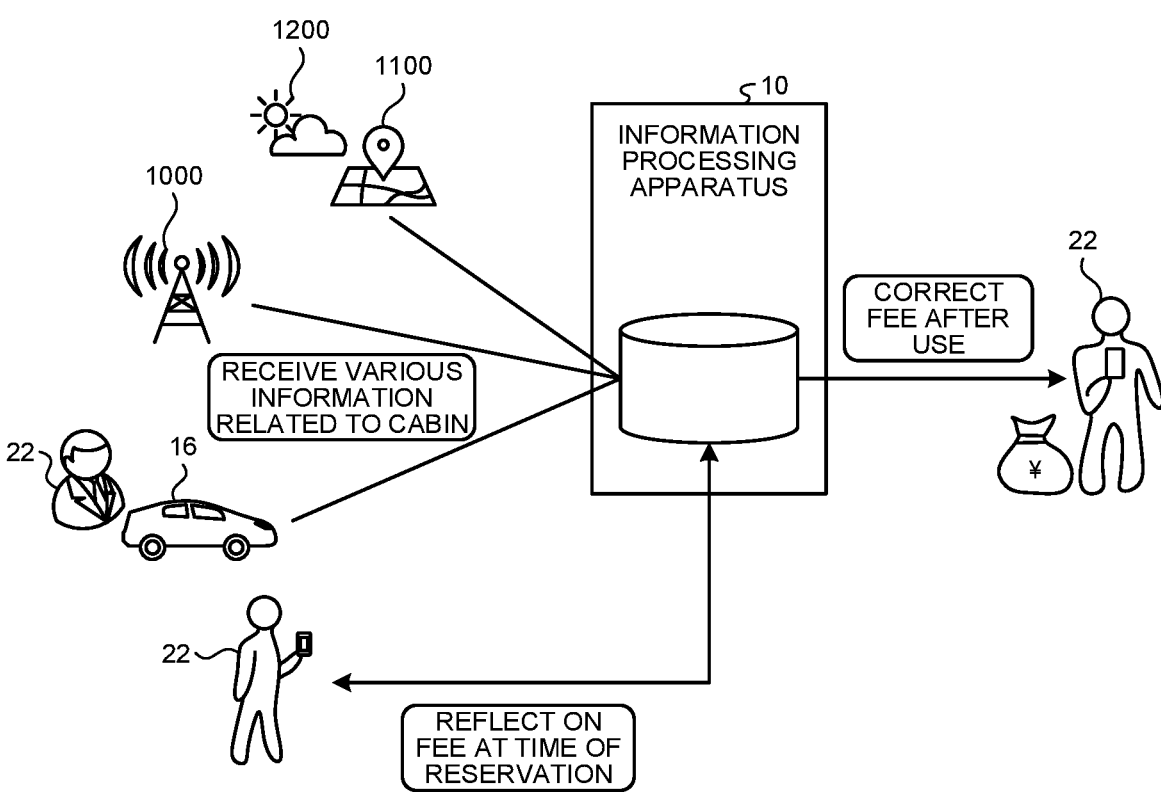
FIG. 12 is an explanatory diagram of a second embodiment.

FIG. 12 is an explanatory diagram of the second embodiment. The information processing apparatus 10 changes the price of the cabin 17 to an appropriate price on the basis of various types of information related to the vehicle 16. The various types of information related to the vehicle 16 include, for example, environmental information of the vehicle 16 predicted before use by the user 22, or environmental information already determined after use by the user 22. Examples of the environment information include the equipment of the vehicle 16 and/or use purpose of the vehicle 16. Examples of the other environmental information include the stop position of the vehicle 16 in the time slot during which the vehicle 16 is used, the surrounding environment, the weather in the time slot during which the vehicle 16 is used, etc. These factors relate to each other, and thereby the utility of the cabin 17 for the user 22 changes.

For example, before the use, the user 22 selects the vehicle 16 of the equipment corresponding to the use purpose of the user 22. For example, it is assumed that the user 22 uses the cabin 17 for reading. However, if the surrounding environment of the stopping place of the vehicle 16 is under construction and the noise is severe, or if the temperature rises in the use time slot and the inside of the cabin 17 is hot after the use, the reading environment is evaluated negatively for the user 22, and the user feels that the usage fee is high. Accordingly, the information processing apparatus 10 determines whether the price is appropriate by comprehensively using the use purpose, the use time slot, the surrounding environment of the stop position, the weather in the use time slot, etc., and sets the price to an appropriate price. For example, the information processing apparatus 10 calculates the appropriate price by weighting a factor of each piece of environmental information such as the surrounding environment and the weather of the stop position for each use purpose. For example, the information processing apparatus 10 sets a predetermined weight depending on whether the area around the stop position of the vehicle 16 is a housing complex, a factory, or under construction. Moreover, the information processing apparatus 10 sets a predetermined weight in accordance with each of sunny, cloudy, rainy, and stormy weather. Moreover, the information processing apparatus 10 sets a predetermined weight in accordance with the number of people on the road around the vehicle. By using these, the information processing apparatus 10 sets the price on the basis of the prediction value before use, and corrects the usage fee on the basis of the confirmed value after use. Note that the information processing apparatus 10 may acquire publicly available information from various organizations, information providing sites, or the like as the environment information. Moreover, it is not limited thereto, and the information processing apparatus 10 may acquire the environment information by various sensors attached to the vehicle 16. For example, the degree of noise is measured using a microphone or a noise sensor attached to the vehicle 16. Moreover, for example, in order to acquire information related to the periphery of the vehicle, the information processing apparatus 10 may analyze the situation around the vehicle using an image of the periphery of the vehicle acquired using a camera attached to the vehicle 16, and generate the environment information.

An example of the environmental information contributing to the price (usage fee) will be described. The environmental information includes weather as an example. There is a temperature in the weather. The utility of the cabin 17 changes due to, for example, hot or cold weather depending on the temperature of the stop position. In addition, falling objects such as rain, snow, hail, and hailstone are also considered as factors. For example, the fact that the user does not want to get wet or the necessity of evacuation affects the utility of the cabin 17.

Also, typhoons, hurricanes, lightning, etc. may be a factor of the utility of the cabin 17 as there is a risk of damage extending to the potential for disaster and evacuation may be required.

In addition, traffic and accommodation-related information can also be factors of the utility of the cabin 17. Public transportation, congestion of mobility, full sky of a hotel, etc. can be factors of utility because some users 22 consider staying in the cabin 17.

In addition, it is also conceivable to use the cabin 17 in order to lower the health hazard risk, and the air quality, the air pollution level, etc. can be a factor of the utility.

In addition, a peripheral event, a state of conflict (how many lending vehicles 16 exist in the same district), and topicality (social network service (SNS)) may also be factors of the utility.

In addition, the price change may be switched between ON and OFF in accordance with the intention of the lender 20. In addition, price fluctuations may be set. For example, a fluctuation range, an upper limit, and a lower limit of the price may be set.

The surrounding environment of the stop position is acquired from the information providing site 1000 such as a map. Moreover, the weather is acquired from an information providing site 1100 such as a weather forecast. Information such as congestion of mobility is received from the transmitter 1200 or the like that transmits traffic information. In addition, accommodation-related information, information representing the air pollution level, surrounding events, etc. can be received from various information providing sites etc.

Moreover, the information processing apparatus 10 may correct the usage fee after use in accordance with whether or not the vehicle 16 has been driven. For example, the information processing apparatus 10 has made a contract as use of a private room space when a contract of use of the vehicle 16 is made, but when it is actually used also as transportation means, the information processing apparatus changes the fee system from the price initially presented as the cabin 17 to that of the transportation means. For example, in a case where the information processing apparatus 10 receives the travel distance from the vehicle 16 and the user 22 drives the vehicle 16, the fee system of the cabin 17 such as 100 yen for 15 minutes is automatically switched to the rental car fee system such as 5000 yen for 6 hours, and the usage fee is corrected. Note that, in the second embodiment, the content that the information processing apparatus 10 corrects the usage fee of the vehicle 16 after use in accordance with the environment information has been described, whereas the information processing apparatus 10 may correct the amount of the fee by applying the environment information to the usage fee to be presented to the user 22 at the time of reservation. For example, the information processing apparatus 10 applies the environmental information to the usage fee presented in advance to the user 22 in consideration of the presence or absence of a surrounding event on the use reservation date, the weather forecast information, etc. as described above.

Third Embodiment

An example of searching for the vehicle 16 that can be reserved in a parking lot when the user 22 is in the parking lot will be described. In the reservation of the vehicle 16, as in the first embodiment, the search condition is input in the user terminal 14 and the search is requested to the information processing apparatus 10, but the way of displaying the vehicle 16 matching the search condition is different.

The user 22 activates the app, enters a search condition, and requests the information processing apparatus 10 to perform a search. Then, the user 22 directs the camera of the user terminal 14 toward the inside of the parking lot and captures an image, and a captured image (frame image) by the camera is displayed on the display of the user terminal 14. The user terminal 14 communicates with the information processing apparatus 10, and transmits information acquired by various sensors included in the user terminal 14 to the information processing apparatus 10. For example, coordinate information representing the position of the user terminal 14, gyro sensor information representing the orientation of the camera of the user terminal 14, etc. are transmitted. The information processing apparatus 10 extracts a vehicle 16 registered in the surroundings from the coordinate information, and if there is a vehicle 16 registered in the surroundings (for example, in the parking lot), the information processing apparatus transmits information representing the orientation and information representing the degree of match with the search condition to the user terminal 14. The user terminal 14 displays guidance information superimposed on the frame image on the basis of the orientation information received from the information processing apparatus 10 and the information representing the degree of match. As the user 22 moves in the parking lot, the displayed frame image changes as needed, and the guidance information is updated each time and displayed by superimposing on the frame image. Therefore, when the user 22 moves in the parking lot, it is possible to guide the user to the position of the vehicle 16 while confirming the guidance information by the position and shape of the guidance information on the display.

Figure 13A:
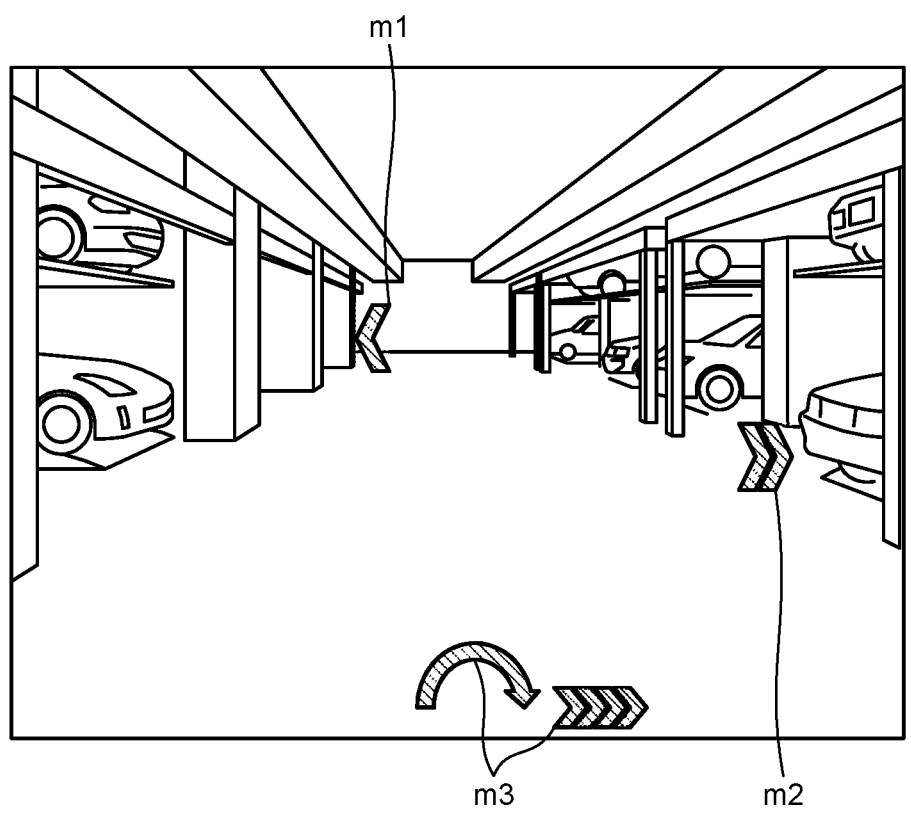
FIG. 13A is a view illustrating an example of a guidance screen displayed by the user terminal of a third embodiment.

FIG. 13A is a diagram illustrating an example of a guidance screen displayed by the user terminal 14. In FIG. 13A, a captured image of the inside of the parking lot and guidance information of an arrow as an example are displayed. The arrow indicates that the vehicle 16 is in the direction indicated by the arrow, and the number of consecutive arrows indicates the degree of match with the search condition.

In FIG. 13A, arrows are displayed at three locations. An arrow m1 indicates that the number of consecutive arrows is one and there is a registered vehicle (vehicle 16) in the direction of the arrow m1, which satisfies one search condition. An arrow m2 indicates that the number of consecutive arrows is two and there is a registered vehicle in the direction of the arrow m2, which satisfies two search conditions. An arrow m3 indicates that the number of consecutive arrows is four and there is a registered vehicle in the direction of the arrow m3, which satisfies four search conditions. Note that, in this example, an indication in the arrow m3 curved in the direction of 180 degrees indicates a direction in which the vehicle 16 is parked, and the number of consecutive arrows beside the arrow m3 corresponds to the degree of matching with the search conditions.

Figure 13B:
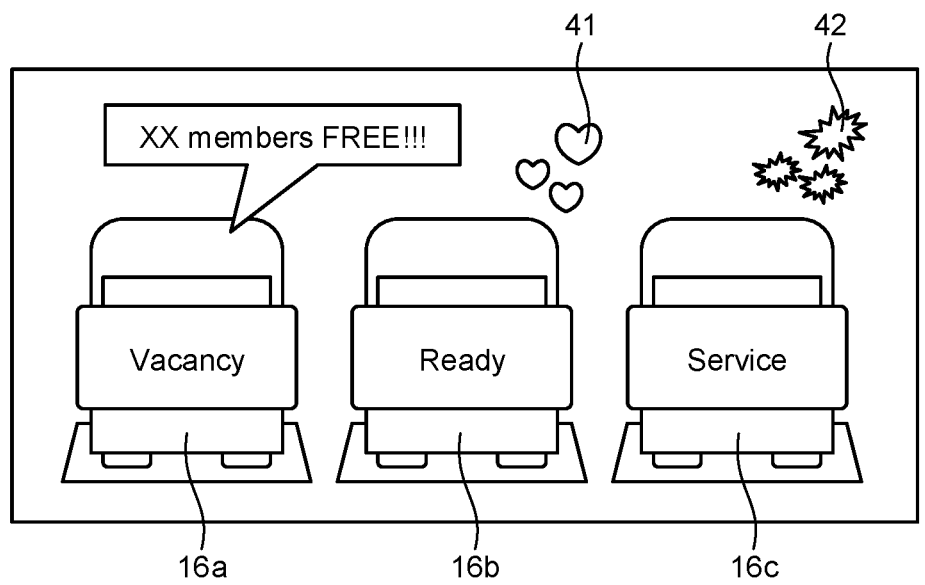
FIG. 13B is a diagram illustrating an example of display information displayed on a captured image of a registered vehicle after being guided to the registered vehicle according to the third embodiment.

FIG. 13B is an example of display information displayed for a captured image of a registered vehicle after being guided to the registered vehicle. FIG. 13B illustrates a display state when three registered vehicles are imaged as an example. Since each of vehicles 16a, 16b, and 16c is a registered vehicle, the state is displayed on each of the vehicles 16a, 16b, and 16c. The states of the vehicles 16a, 16b, and 16c can be acquired together with azimuth information or the like from the information processing apparatus 10 when the search conditions are transmitted to the information processing apparatus 10.

In FIG. 13B, the vehicle 16a is displayed with an indication of "Vacancy", which indicates that it is available as the vehicle 16a is not reserved by another user 22. The vehicle 16b is displayed with an indication of "Ready", which indicates that there is a reservation and the vehicle 16b waits for the start of being used. The vehicle 16c is displayed with an indication of "Service", which indicates a state where the reservation person is using the vehicle. These indications are convenient for both the user 22 who searches for the reserved vehicle 16 and the user who does not reserve the use of the vehicle 16 and searches for the available vehicle 16. Moreover, the information processing apparatus 10 may additionally display identification information such as a vehicle type and a vehicle number using AR display. In a case where the vehicle 16 parked adjacent to the vehicle 16 to be lent has a similar appearance, the user 22 can easily identify the vehicle 16 to be lent. Moreover, the information processing apparatus 10 may perform AR display of an icon indicating the state inside the vehicle, such as status displays 41 and 42. The status display 41 indicates that the inside of the vehicle 16b is cleaned and well kept, or the odor inside the vehicle 16b is equal to or less than a threshold. In addition, the status display 42 indicates that the inside of the vehicle 16c is not cleaned, or the odor inside the vehicle 16c is equal to or more than the threshold. Whether or not the interior of the vehicle 16 is cleaned is determined by capturing an image of the interior of the vehicle by a camera attached to the vehicle 16, and analyzing the captured image by the information processing apparatus 10. In addition, the information processing apparatus 10 measures an odor using an odor sensor attached to the vehicle 16, and determines an odor inside the vehicle 16 based on a value of the measured odor.

Figure 14:
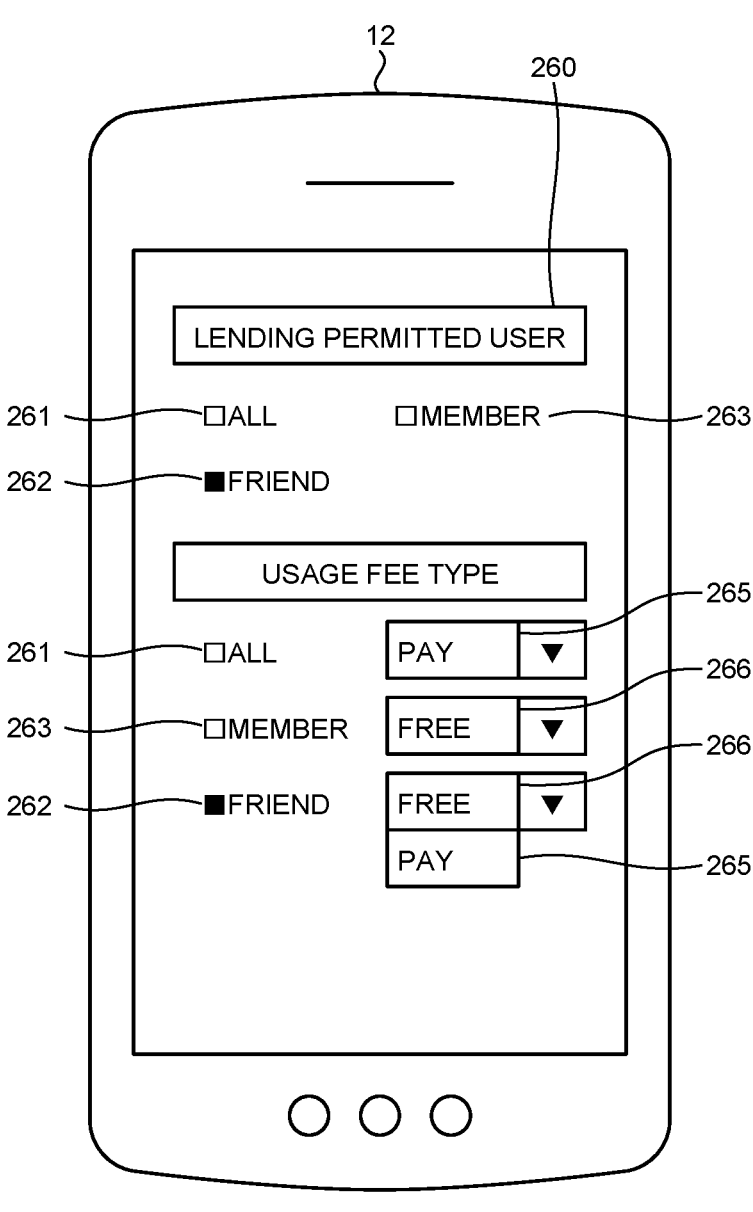
FIG. 14 is a diagram illustrating an example of a registration UI when an owner of a vehicle registers a vehicle to be lent out.

FIG. 14 is a diagram illustrating an example of the registration UI 260 when the owner of the vehicle 16 registers the vehicle 16 to be lent. At the time of registration for lending the vehicle 16, the owner of the vehicle 16 can specify the user type permitted to lend from "all" 261, "friend" 262, or "member" 263. "All" indicates that lending of the vehicle 16 is permitted to all users. "Friend" indicates that lending to a user having a friendship with the owner of the vehicle 16 is permitted. Related to whether or not the user is a friend, the information processing apparatus 10 may set whether or not each user is a friend of the owner of the vehicle 16 on the service platform according to the present disclosure. Moreover, the information processing apparatus 10 may set a user having a friendship with the owner of the vehicle 16 in another SNS to have a friendship on the service platform according to the present disclosure by cooperation with various SNSs. "Member" indicates that lending of the vehicle 16 to a user who is a commercial facility member related to the parking lot where the vehicle 16 is stopped is permitted. In addition, the usage fee type of the vehicle 16 can be designated from either "pay" 265 or "free" 266 according to the user type. In a case where the vehicle 16 is parked in a parking lot provided beside the commercial facility, a member of the commercial facility may use the vehicle 16 for free.

In this manner, the user 22 can make a reservation while directly checking the vehicle 16.

Note that the computer program for executing the processing in the above-described embodiment has a module configuration including each of the functional units, and as actual hardware, for example, a CPU (processor circuit) reads an information processing program from a ROM or an HDD and executes the information processing program, and thereby each of the functional units described above is loaded onto a RAM (main storage), and each of the functional units described above is generated on the RAM (main storage). Note that some of or all the functional units described above can also be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

First Supplementary Note (Supplementary Note 1)

An information presentation method of outputting information related to a stop position of a mobile body to a user terminal in an information processing system for lending a cabin of the mobile body, the information presentation method comprising:

registering position information representing a stop position of the mobile body;

registering purpose information representing a purpose of use of the cabin of the mobile body; and outputting, to the user terminal, trend information representing a trend of a purpose of use of the cabin in an area including the position information of mobile bodies, the trend information being output on the basis of correspondence information by which the position information of the mobile bodies is correlated with the purpose information of the mobile bodies.

(Supplementary Note 2)

The information presentation method according to the supplementary note 1, wherein the outputting of the trend information includes:

ranking pieces of the purpose information by counting the purpose information correlated with the position information included in a unit area out of pieces of the position information; and outputting, as the trend information, the pieces of the purpose information ranked for each unit area.

(Supplementary Note 3)

The information presentation method according to the supplementary note 2, further comprising displaying the trend information on the user terminal, the displaying of the trend information including displaying a piece of the purpose information as a first rank by an icon or color-coding for each unit area on a map.

(Supplementary Note 4)

The information presentation method according to the supplementary note 3, wherein the displaying of the trend information includes displaying adjacent ones of the unit areas, whose trend information is the same as each other, by combining the adjacent ones into a single area while displaying the piece of the purpose information as the first rank by an icon or color-coding.

(Supplementary Note 5)

The information presentation method according to the supplementary note 4, further comprising, when one of the unit areas is designated by a user, displaying a pieces of the purpose information as a second rank or a second or lower rank in the trend information of the unit area designated by the user.

(Supplementary Note 6)

The information presentation method according to the supplementary note 2, wherein the outputting of the trend information includes:

ranking pieces of the purpose information by counting latest purpose information or purpose information in a past predetermined period as the purpose information correlated with the position information included in the unit area out of the pieces of the position information; and outputting, as the trend information, the pieces of the purpose information ranked for each unit area.

(Supplementary Note 7)

The information presentation method according to the supplementary note 6, wherein the outputting of the trend information includes:

ranking pieces of the purpose information in units of time slots in a day, days of week, or holiday by counting purpose information in a past predetermined period as the purpose information correlated with the position information included in the unit area out of the pieces of the position information; and outputting, as the trend information, the pieces of the purpose information ranked for each unit area.

(Supplementary Note 8)

The information presentation method according to the supplementary note 7, wherein the outputting of the trend information includes:

ranking pieces of the purpose information by receiving designation of a lending period of the cabin from the user terminal, the ranking being performed in units of time slots in a day, days of week, or holidays corresponding to the lending period; and outputting, as the trend information, the pieces of the purpose information to the user terminal.

(Supplementary Note 9)

The information presentation method according to the supplementary note 2, wherein the outputting of the trend information includes:

updating, in a time slot, the pieces of the purpose information ranked for each unit area; and outputting the updated pieces of the purpose information.

(Supplementary Note 10)

The information presentation method according to the supplementary note 2, wherein the registering of the purpose information includes registering trouble information representing trouble occurring when the cabin of the mobile body is used; and the outputting of the trend information includes:

ranking pieces of the purpose information by counting the trouble information and the purpose information correlated with the position information included in the unit area out of pieces of the position information; and outputting, as the trend information, the pieces of the purpose information ranked for each unit area.

(Supplementary Note 11)

The information presentation method according to the supplementary note 3, wherein the registering of the purpose information includes registering trouble information representing trouble occurring when the cabin of the mobile body is used; and the displaying of the trend information on the user terminal includes displaying, with color-coding in a designated color, a unit area having a high ratio of the trouble information.

(Supplementary Note 12)

The information presentation method according to any one of the supplementary notes 1 to 11, further comprising transmitting, for each unit area, purpose information or cabin equipment information to a user terminal of a lender of the mobile body stopping at a position included in the corresponding unit area, the cabin equipment information representing a purpose highly needed in the corresponding unit area.

(Supplementary Note 13)

The information presentation method according to any one of the supplementary notes 1 to 12, further comprising:

predicting a future need of a user; and transmitting purpose information representing a purpose highly needed, a time slot, or a place to a user terminal of a lender of the mobile body.

(Supplementary Note 14)

An information processing apparatus comprising:

a first receiving device configured to receive position information representing a stop position of a mobile body;

a second receiving device configured to receive purpose information representing a purpose of use of a cabin of the mobile body;

a storage device in which correspondence information is stored, the correspondence information correlating the position information of mobile bodies and the purpose information of the mobile bodies with each other; and an output device configured to output, on the basis of the correspondence information, trend information representing a trend of a purpose of use of the cabin in an area including the position information of the mobile bodies.

Second Supplementary Note (Supplementary Note 1)

A fee calculation method of calculating a usage fee of a mobile body in an information processing system for lending a cabin of the mobile body, the method including:

a first step of acquiring position information representing a stop position of the mobile body;

a second step of acquiring purpose information of the mobile body, a use time slot of the mobile body, or environment information around the stop position of the mobile body; and a third step of calculating a usage fee for using the cabin of the mobile body on the basis of the purpose information, the use time slot, or the environment information.

(Supplementary Note 2)

The fee calculation method according to the supplementary note 1, wherein, in the third step, a usage fee at the time of lending to a user is corrected to a usage fee for a purpose actually used by the user on the basis of the purpose information, the use time slot, or the environment information.

(Supplementary Note 3)

The fee calculation method according to the supplementary note 1 or 2, wherein, in the third step, a usage fee for using the cabin of the mobile body is calculated by weighting any information of the purpose information, the use time slot, and the environment information to be applied.

(Supplementary Note 4)

An information processing apparatus including:

a first receiving unit that receives position information representing a stop position of the mobile body;

a second receiving unit that receives purpose information of the mobile body, a use time slot of the mobile body, or environment information around the stop position of the mobile body; and a calculation unit that calculates a usage fee for using the cabin of the mobile body on the basis of the purpose information, the use time slot, or the environment information.

Third Supplementary Note (Supplementary Note 1)

A vehicle search method of searching with a user terminal for a vehicle whose cabin is available, the vehicle being registered in an information processing apparatus, the vehicle search method including:

a first step of transmitting search condition information of the cabin of the mobile body from the user terminal to the information processing apparatus;

a second step of capturing an image of a stopping space in the user terminal and transmitting information representing a position and an attitude of the user terminal to the information processing apparatus;

a third step of displaying, on the user terminal, guidance information for guiding a user to a position where a vehicle of a search result transmitted from the information processing apparatus is present; and a fourth step of displaying vehicle information of the vehicle in a captured image of the vehicle when the vehicle of the search result is captured by the user terminal.

(Supplementary Note 2)

The vehicle search method according to the supplementary note 1, wherein, in the third step, a direction indicating a stop position at which the vehicle is stopped in the search result is displayed as the guidance information with respect to the captured image displayed on the user terminal.

(Supplementary Note 3)

The vehicle search method according to the supplementary note 2, wherein, in the third step, in a case where there is a plurality of the vehicles in the search result, directions indicating stop positions of the respective vehicles are displayed, and information representing a degree of match with the search condition information of the vehicles in respective directions is displayed with respect to the respective directions to be displayed.

(Supplementary Note 4)

The vehicle search method according to any one of the supplementary notes 1 to 3, wherein, in the fourth step, when a plurality of vehicles of the search result is displayed in the screen of the user terminal by image capturing, vehicle information of the vehicles is displayed on each of the displayed vehicles.

(Supplementary Note 5)

An information processing apparatus comprising:

a unit that receives search condition information of a cabin of a mobile body; and a unit that outputs guidance information for guiding a user to a position where a vehicle of a search result based on the search condition information is present and vehicle information of the vehicle on a display screen for capturing an image of a stopping space.

What is claimed is:

1. An information presentation method of outputting information related to a stop position of a mobile body to a user terminal in an information processing system for lending a cabin of the mobile body, the information presentation method comprising:

registering position information representing a stop position of the mobile body in an area;

registering purpose information representing a purpose of use of the cabin of the mobile body in the lending of the cabin; and transmitting, to the user terminal, trend information representing a trend of the purpose information representing purposes of use of cabins of mobile bodies in the area in a past and including position information of the mobile bodies, the trend information being transmitted based on correspondence information by which the position information of the mobile bodies is correlated with the purpose information of the mobile bodies;

setting unit areas of map data in the area under a condition that the unit areas do not cross predetermined roads included in the map data;

displaying the trend information on a map on a touch panel of the user terminal, the displaying of the trend information including:

displaying a piece of the purpose information as a first rank by an icon or color-coding for each unit area of the map data on the map; and displaying adjacent ones of the unit areas, whose trend information includes same ranks of the purpose information, by combining the adjacent ones of the unit areas into a single unit area, while displaying the piece of the purpose information of the first rank by the icon or the color-coding; and setting at least a part of a stop period of the mobile body at the stop position as a lending period of the cabin of the mobile body and controlling the mobile body to one of permit or prohibit travelling of the mobile body during the lending period.

2. The information presentation method according to claim 1, further comprising, when one of the unit areas among the unit areas is designated by a user via the touch panel of the user terminal, displaying, in a pop-up on the touch panel, an icon corresponding to a piece of the purpose information as a second or lower rank in the trend information of the one of the unit areas designated by the user.

* * * * *